(12) United States Patent
Tsubouchi

(10) Patent No.: US 10,137,762 B2
(45) Date of Patent: Nov. 27, 2018

(54) VEHICULAR ADSORPTION TYPE AIR CONDITIONING DEVICE

(71) Applicant: TOYOTA JIDOSHA KABUSHIKI KAISHA, Toyota-shi, Aichi-ken (JP)

(72) Inventor: Masakatsu Tsubouchi, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 192 days.

(21) Appl. No.: 15/275,826

(22) Filed: Sep. 26, 2016

(65) Prior Publication Data

US 2017/0144508 A1    May 25, 2017

(30) Foreign Application Priority Data

Nov. 20, 2015 (JP) ................. 2015-227991

(51) Int. Cl.
| | |
|---|---|
| *B60H 1/32* | (2006.01) |
| *F25B 17/02* | (2006.01) |
| *F25B 30/04* | (2006.01) |
| *F25B 17/08* | (2006.01) |

(Continued)

(52) U.S. Cl.
CPC ........... *B60H 1/3201* (2013.01); *F25B 17/02* (2013.01); *F25B 17/083* (2013.01); *F25B 27/02* (2013.01); *F25B 30/04* (2013.01); *B60H 1/00899* (2013.01); *Y02A 30/274* (2018.01)

(58) Field of Classification Search
CPC .... B60H 1/3201; F25B 17/083; F25B 15/006; F25B 30/04; F25B 2315/006
See application file for complete search history.

(56) References Cited

U.S. PATENT DOCUMENTS

| | | | | |
|---|---|---|---|---|
| 5,761,925 A | * | 6/1998 | Maeda | ................... F24F 3/1411 62/476 |
| 2005/0257547 A1 | * | 11/2005 | Hirao | ................. B60H 1/00392 62/244 |

(Continued)

FOREIGN PATENT DOCUMENTS

| | | |
|---|---|---|
| CN | 103587373 A | 2/2014 |
| JP | H05-126432 A | 5/1993 |
| JP | 2000-177374 A | 6/2000 |

(Continued)

OTHER PUBLICATIONS

English translation of JP4265067B2.*

*Primary Examiner* — David Teitelbaum
*Assistant Examiner* — Schyler S Sanks
(74) *Attorney, Agent, or Firm* — Oliff PLC

(57) ABSTRACT

A vehicular adsorption type air conditioning device including: a heater core and an interior heat exchanger that perform heat exchange between air inside a vehicle cabin and a heating medium; an exterior heat exchanger that performs heat exchange between air outside the vehicle cabin and the heating medium; a heating flow path section that circulates the heating medium between a high temperature heat source of the vehicle and the heater core; a plurality of adsorption vessels each including an adsorption section and an evaporation-condensation section, with an adsorbent and a refrigerant sealed within the adsorption vessels; and a flow path system; the flow path system being capable of switching between a cooling mode, a first heating mode, and a second heating mode.

1 Claim, 17 Drawing Sheets

(51) Int. Cl.
*F25B 27/02* (2006.01)
*B60H 1/00* (2006.01)

(56) References Cited

U.S. PATENT DOCUMENTS

2012/0192587 A1* 8/2012 Li .................... F25B 15/008
                                                    62/477
2014/0047853 A1   2/2014 Zhong et al.

FOREIGN PATENT DOCUMENTS

| JP | 2006-125713 A | 5/2006 | |
|----|---------------|--------|---|
| JP | 2008-008582 A | 1/2008 | |
| JP | 4265067 B2 * | 5/2009 | ......... B60H 1/00385 |
| JP | 2009-262748 A | 11/2009 | |

* cited by examiner

VEHICULAR ADSORPTION TYPE AIR CONDITIONING DEVICE

CROSS-REFERENCE TO RELATED APPLICATION

This application is based on and claims priority under 35 USC 119 from Japanese Patent Application No. 2015-227991 filed on Nov. 20, 2015, the disclosure of which is incorporated by reference herein.

BACKGROUND

Technical Field

The present invention relates to a vehicular adsorption type air conditioning device.

Related Art

Japanese Patent Application Laid-Open (JP-A) No. 2000-177374 describes a vehicular adsorption refrigerator applied to a vehicle in which coolant liquid of an engine is cooled by a radiator. This vehicular adsorption refrigerator includes an adsorption vessel in which a liquid refrigerant, and an adsorbent that adsorbs refrigerant vapor and desorbs the adsorbed refrigerant vapor when heated, are sealed to exhibit refrigerating ability, and a vehicle-exterior heat exchanger that cools the coolant liquid that circulates through the adsorption vessel.

When the temperature of the engine coolant liquid reaches a specific temperature or higher, the radiator and the vehicle-exterior heat exchanger cool the engine coolant liquid. This thereby enables a reduction in size of the radiator in comparison to cases in which the engine coolant liquid is cooled by the radiator alone.

SUMMARY

The vehicular adsorption refrigerator configured as described above does not give consideration to improving heating efficiency.

In consideration of the above circumstances, an object of the present invention is to obtain a vehicular adsorption type air conditioning device capable of improving heating efficiency.

In a first aspect of the present invention, a vehicular adsorption type air conditioning device comprising: a heater core and an interior heat exchanger that perform heat exchange between air inside a vehicle cabin and a heating medium; an exterior heat exchanger that performs heat exchange between air outside the vehicle cabin and the heating medium; a heating flow path section that circulates the heating medium between a high temperature heat source of the vehicle and the heater core; a plurality of adsorption vessels each including an adsorption section and an evaporation-condensation section, with an adsorbent and a refrigerant sealed within the adsorption vessels; and a flow path system that interchanges the heating medium between: the high temperature heat source, the exterior heat exchanger, and the interior heat exchanger; and the plurality of adsorption vessels, and that, while causing an adsorption process to take place in one or a plurality of the adsorption vessels, causes a desorption process to take place in other of the adsorption vessels; the flow path system being capable of switching between a cooling mode in which the heating medium is circulated between the evaporation-condensation section on an adsorption process side and the interior heat exchanger, a first heating mode in which the heating medium is circulated between the interior heat exchanger and the adsorption section on the adsorption process side or the evaporation-condensation section on a desorption process side, or the heating medium is circulated between the interior heat exchanger and both the adsorption section on the adsorption process side and the evaporation-condensation section on the adsorption process side, and a second heating mode in which the heating medium is circulated between the interior heat exchanger and both the adsorption section on the adsorption process side and the evaporation-condensation section on the desorption process side.

In the first aspect of the present invention, the heating medium is circulated between the heater core and the high temperature heat source of the vehicle due to providing the heating flow path section. This thereby enables waste heat of the high temperature heat source to be utilized to heat the vehicle cabin. Moreover, in the present invention, the flow path system that interchanges the heating medium between: the high temperature heat source, the exterior heat exchanger, and the interior heat exchanger; and the plural adsorption vessels, is capable of switching between the cooling mode, the first heating mode, and the second heating mode.

In the cooling mode, the heating medium is circulated between the evaporation-condensation section on the adsorption process side and the interior heat exchanger. This thereby enables the latent heat of evaporation of refrigerant to be utilized to cool the vehicle cabin. In the first heating mode, the heating medium circulates between the interior heat exchanger, and the adsorption section on the adsorption process side or the evaporation-condensation section on the desorption process side, or the heating medium circulates between the interior heat exchanger and both the adsorption section on the adsorption process side and the evaporation-condensation section on the adsorption process side. This thereby enables the heat of adsorption, heat of condensation, or the heat of a combination of the heat of adsorption and the heat of vaporization of the refrigerant to be utilized to heat the vehicle cabin. In the second heating mode, the heating medium is circulated between the interior heat exchanger and both the adsorption section on the adsorption process side and the evaporation-condensation section on the desorption process side. This thereby enables the heat of adsorption and the heat of condensation of the refrigerant to be utilized to heat the vehicle cabin.

Accordingly, the present invention enables not only waste heat of the high temperature heat source, but also heat of adsorption and heat of condensation to be utilized as auxiliary heat sources to heat the vehicle cabin. This thereby enables heating efficiency to be improved.

As described above, the vehicular adsorption type air conditioning device according to the present invention enables heating efficiency to be improved.

BRIEF DESCRIPTION OF THE DRAWINGS

Exemplary embodiments of the present invention will be described in detail based on the following figures, wherein.

DETAILED DESCRIPTION

First Exemplary Embodiment

Figure 1:
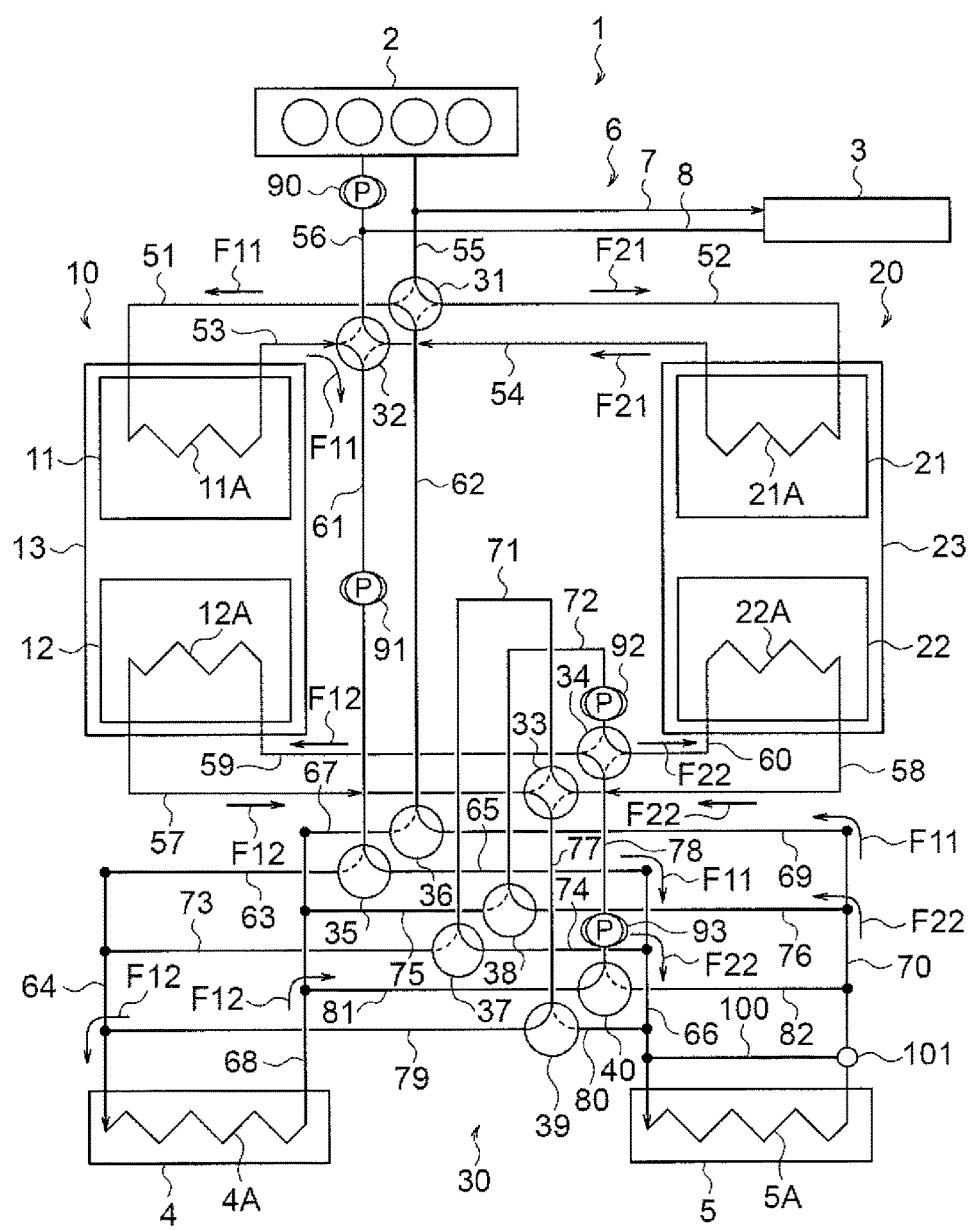
FIG. 1 is a schematic diagram illustrating a cooling mode of a vehicular adsorption type air conditioning device according to a first exemplary embodiment of the present invention.
Figure 2:
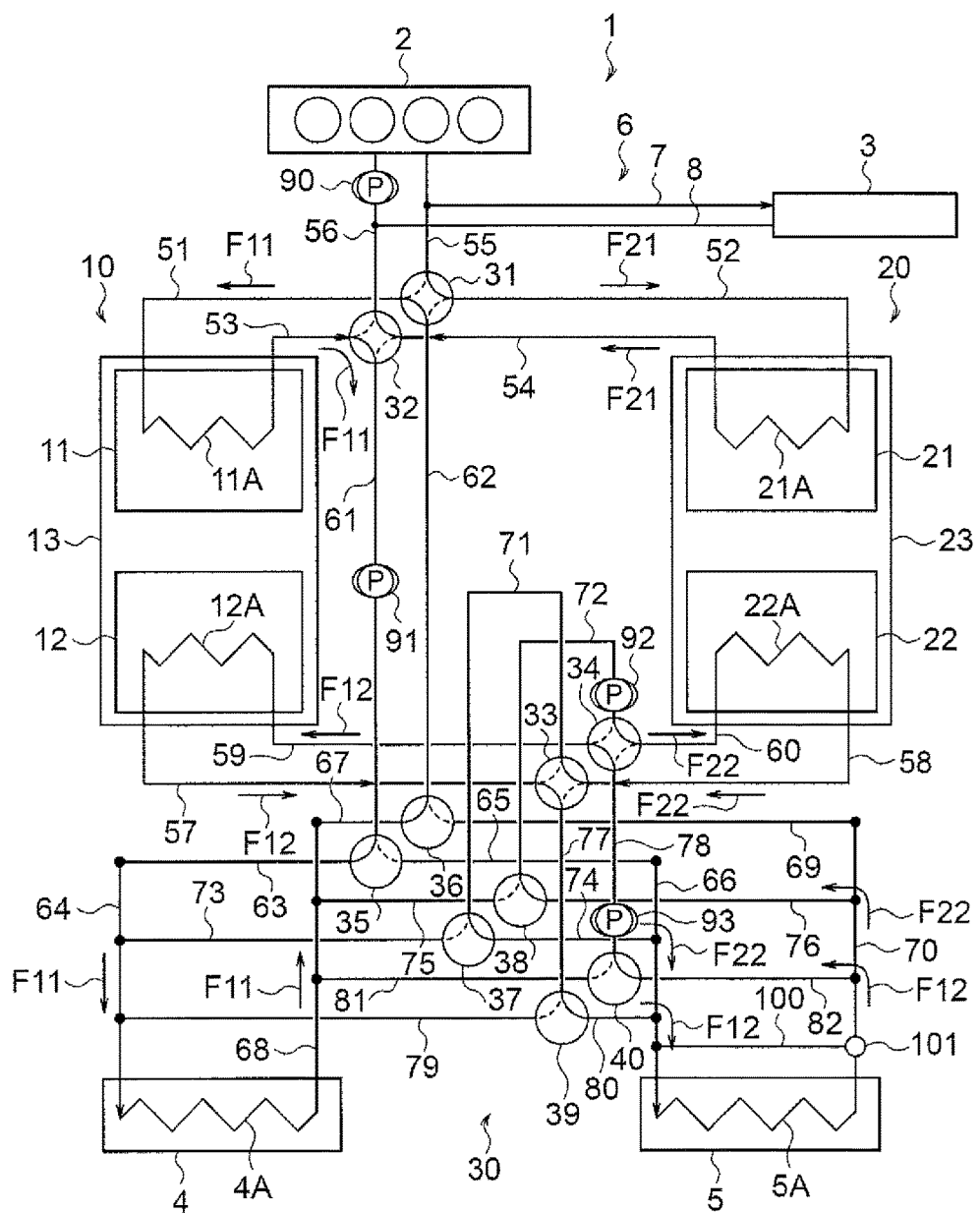
FIG. 2 is a schematic diagram corresponding to FIG. 1, illustrating a first heating mode of a vehicular adsorption type air conditioning device according to the first exemplary embodiment.
Figure 3:
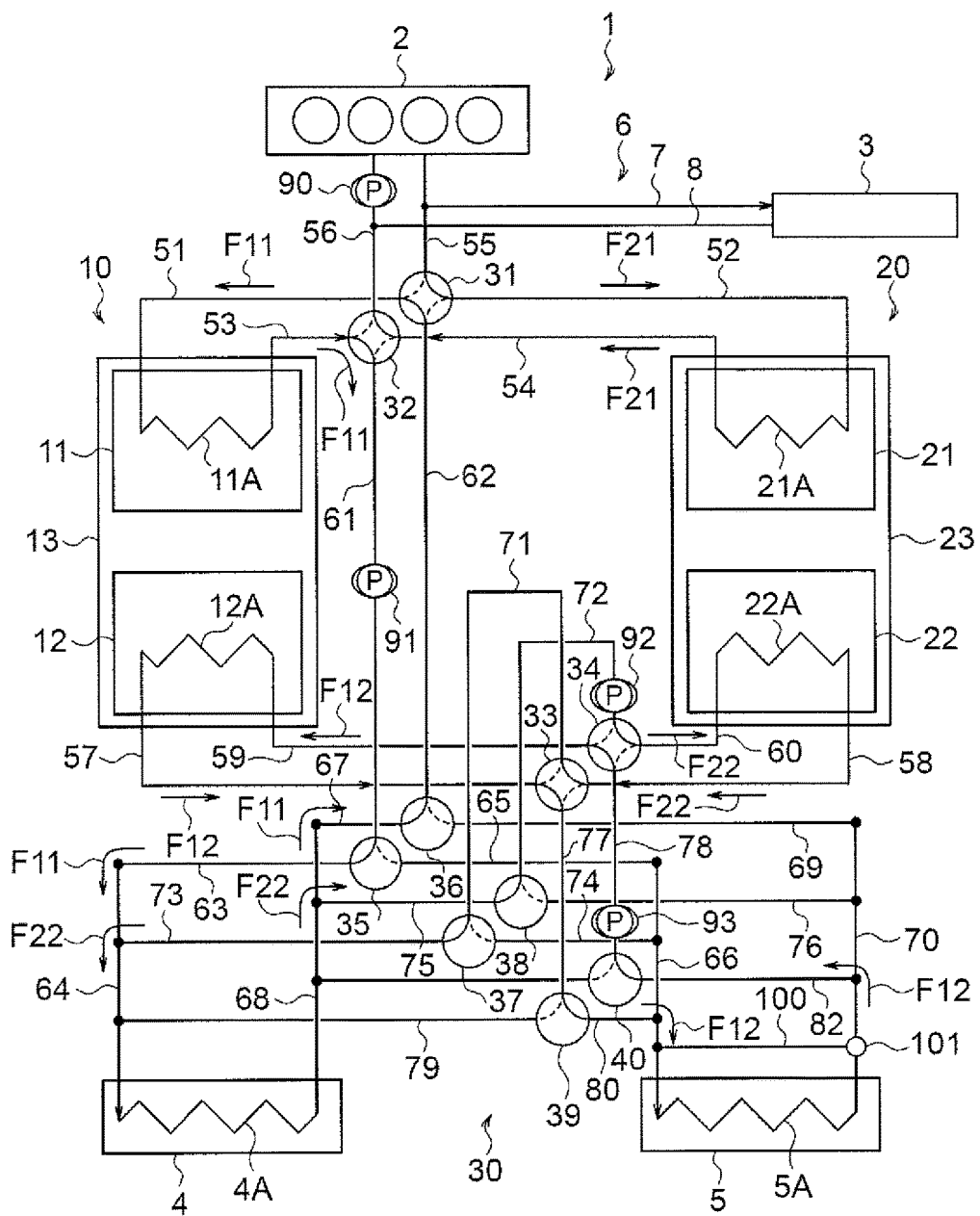
FIG. 3 is a schematic diagram corresponding to FIG. 1, illustrating a second heating mode of a vehicular adsorption type air conditioning device according to the first exemplary embodiment.

Explanation follows regarding a vehicular adsorption type air conditioning device according to a first exemplary embodiment of the present invention, with reference to FIG. 1 to FIG. 5. As illustrated in FIG. 1 to FIG. 3, the vehicular adsorption type air conditioning device 1 includes an engine 2, this being a high temperature heat source, a heater core 3, an interior heat exchanger 4, an exterior heat exchanger 5, a heating flow path section 6, plural (a pair of in this example) adsorption vessels 10, 20, and a flow path system 30.

The engine 2 is a liquid-cooled internal combustion engine, and the exterior heat exchanger 5 is a radiator that performs heat exchange between coolant liquid of the engine 2 and air outside the vehicle. The coolant liquid of the engine 2 corresponds to the "heating medium" according to the present invention, and, for example, is configured by water containing long life coolant (LLC). In the following explanation, the exterior heat exchanger 5 is referred to as the "radiator 5", and the coolant liquid of the engine 2 is referred to as the "heating medium".

The vehicular adsorption type air conditioning device 1, that is a waste heat-driven air conditioner driven by waste heat of the engine 2, interchanges high temperature and cool temperature heating medium, and interchanges cool temperature and cold temperature heating medium, to and from the pair of adsorption vessels 10, 20 having a refrigerant and an adsorbent sealed therein. Accordingly, while one out of the pair of adsorption vessels 10, 20 is made to perform an adsorption process with the refrigerant (adsorption and evaporation), the other of the pair of adsorption vessels 10, 20 is made to perform a desorption process with the refrigerant (desorption and condensation). These processes are switched so as to alternate to achieve a configuration in which a cold temperature for cooling is continuously obtained using latent heat of evaporation.

Figure 4:
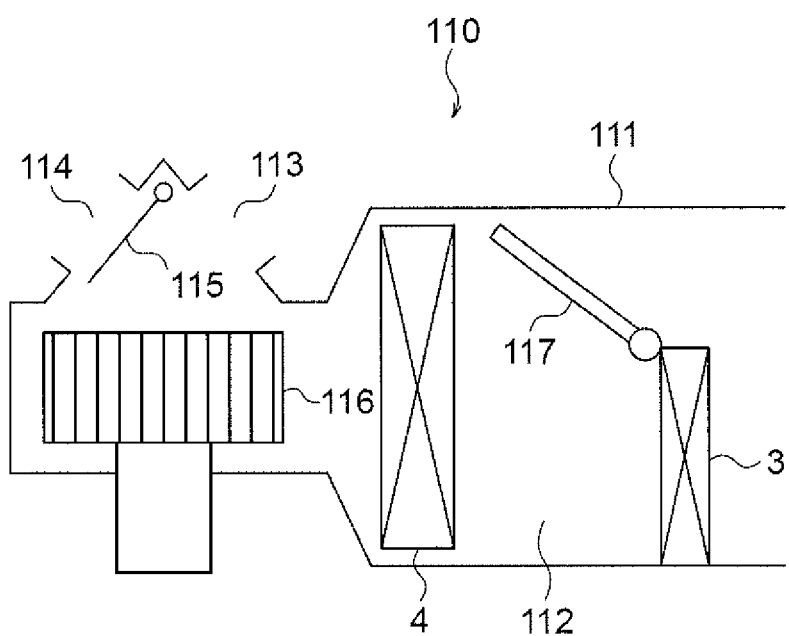
FIG. 4 is a schematic diagram illustrating an interior air conditioning unit provided to a vehicular adsorption type air conditioning device according to the first exemplary embodiment.
Figure 5:
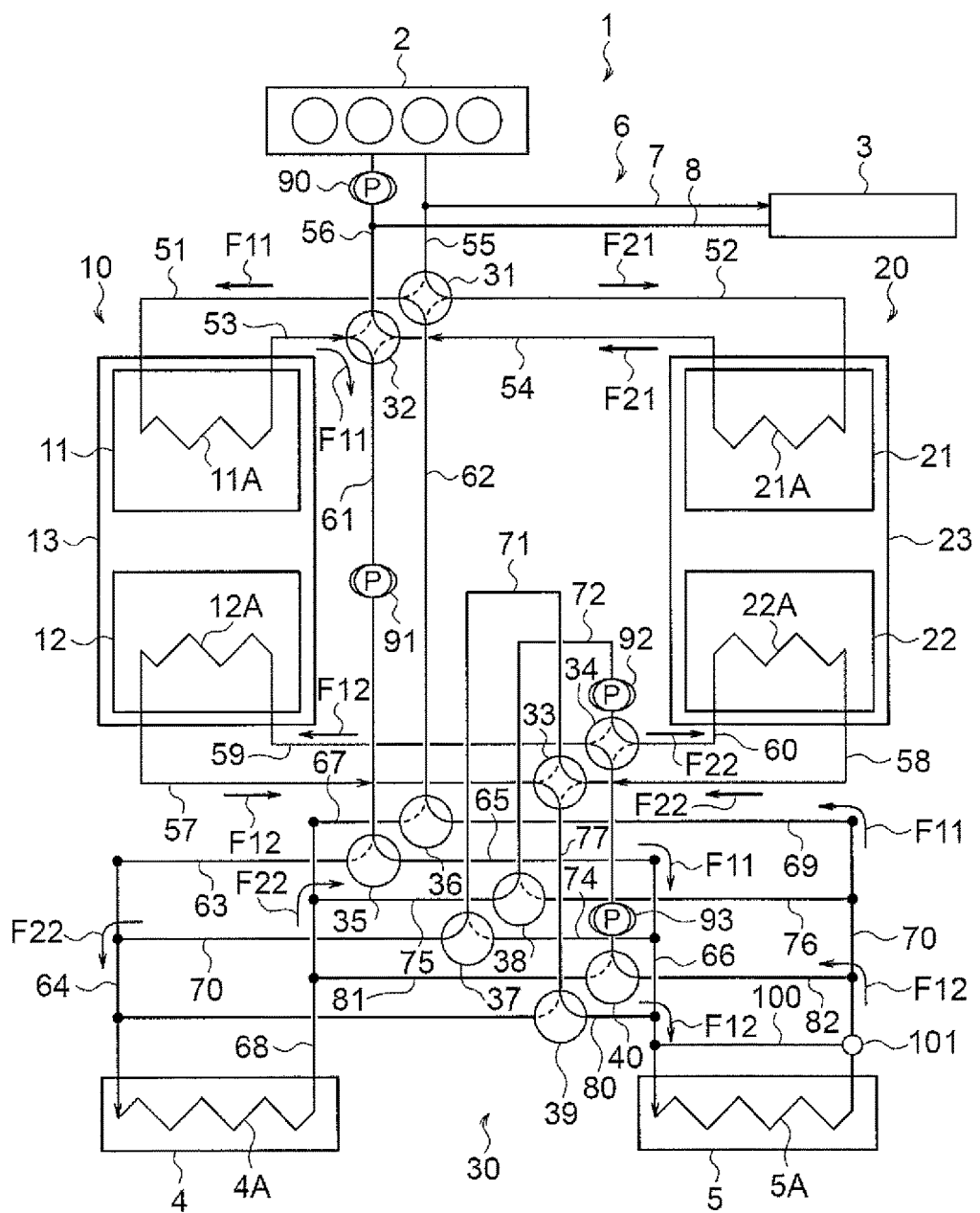
FIG. 5 is a schematic diagram corresponding to FIG. 1, illustrating a modified example of a first heating mode of a vehicular adsorption type air conditioning device according to the first exemplary embodiment.

The heater core 3 and the interior heat exchanger 4 perform heat exchange between air inside the vehicle and the heating medium. As illustrated in FIG. 4, the heater core 3 and the interior heat exchanger 4 are installed inside a casing 111 of an interior air conditioning unit 110 provided inside the vehicle cabin. The casing 111 forms a path 112 through which air for air conditioning flows. The casing 111 is formed with an interior air intake port 113 that takes in air from inside the vehicle cabin, and an external air intake port 114 that takes in air from outside the vehicle cabin. An interior/exterior switching door 115 is provided to switch opening and closing of the two intake ports 113, 114.

A blower 116 that blows air taken in through the two intake ports 113, 114 toward the vehicle cabin interior is installed at an airflow direction downstream side (referred to below as simply the "downstream side") with respect to the two intake ports 113, 114. The interior heat exchanger 4 is installed at the downstream side of the blower 116. The heater core 3 is installed at the downstream side of the interior heat exchanger 4. Namely, the interior heat exchanger 4 is installed between the blower 116 and the heater core 3. An air mixing damper 117 is provided in the vicinity of the heater core 3. The air mixing damper 117 regulates the temperature of air blown inside the vehicle cabin by regulating the proportions of air that passes the heater core 3 and air that bypasses the heater core 3 in the air that has passed through the interior heat exchanger 4.

As illustrated in FIG. 1, the heating flow path section 6 is configured by a pair of pipes 7, 8 respectively connected to an inlet and outlet of a heating medium path (water jacket), not illustrated in the drawings, provided to the engine 2, and to an inlet and outlet of a heating medium path, not illustrated in the drawings, provided to the heater core 3. The heating flow path section 6 is configured so as to circulate the coolant liquid (heating medium) of the engine 2 between the engine 2 and the heater core 3 using a water pump 90 that is driven by the engine 2.

The pair of adsorption vessels 10, 20 respectively include adsorption sections 11, 21 that adsorb and desorb the refrigerant, and evaporation-condensation sections 12, 22 that evaporate and condense the refrigerant. The adsorption sections 11, 21 and the evaporation-condensation sections 12, 22 are housed inside metal cases 13, 23, inside which the refrigerant is sealed in a state in which a substantial vacuum is maintained inside the cases 13, 23. The refrigerant is, for example, water or ammonia. An adsorbent, not illustrated in the drawings, is sealed inside the respective adsorption sections 11, 21. The adsorbent is, for example, silica gel, a zeolite, activated carbon, activated alumina, or the like. The respective adsorption sections 11, 21 are formed with first heating medium paths 11A, 21A, through which the heating medium flows, and the respective evaporation-condensation sections 12, 22 are formed with second heating medium paths 12A, 22A through which the heating medium flows.

The flow path system 30 configures flow paths for interchanging high temperature, cool temperature, or cold temperature heating medium between: the engine 2, the radiator 5, the interior heat exchanger 4; and the pair of adsorption vessels 10, 20. The flow path system 30 is configured including a pair of adsorption side 4-way valves 31, 32, a pair of evaporation and condensation side 4-way valves 33, 34, a pair of adsorption side 3-way valves 35, 36, a pair of condensation side 3-way valves 37, 38, a pair of evaporation side 3-way valves 39, 40, pipes 51 to 82, water pumps 90 to 93, a bypass pipe 100, a flow rate control valve 101, and a controller, not illustrated in the drawings.

The pair of adsorption side 3-way valves 35, 36, the pair of evaporation and condensation side 3-way valves 37, 38, and the pair of evaporation side 3-way valves 39, 40 are disposed further toward the side of the interior heat exchanger 4 and the radiator 5 than the pair of adsorption side 4-way valves 31, 32 and the pair of evaporation and condensation side 4-way valves 33, 34. Note that in the following explanation, the pair of adsorption side 4-way valves 31, 32 and the pair of evaporation and condensation side 4-way valves 33, 34 are sometimes referred to as the 4-way valves 31 to 34, and the pair of adsorption side 3-way valves 35, 36, the pair of condensation side 3-way valves 37, 38, and the pair of evaporation side 3-way valves 39, 40 are sometimes referred to as the 3-way valves 35 to 40.

The pair of adsorption side 4-way valves 31, 32 are respectively connected to the adsorption sections 11, 21 of the pair of adsorption vessels 10, 20 through the pipes 51 to 54, and are respectively connected to the engine 2 through the pipes 55, 56. More specifically, one adsorption side 4-way valve 31 is connected to respective inlets of the first heating medium paths 11A, 21A through the pipes 51, 52, and the other adsorption side 4-way valve 32 is connected to respective outlets of the first heating medium paths 11A, 21A through the pipes 53, 54. The one adsorption side 4-way valve 31 is connected to an outlet of the heating medium path of the engine 2 through the pipe 55 and part of the pipe 7 mentioned above, and the other adsorption side 4-way valve 32 is connected to an inlet of the heating medium path of the engine 2 through the pipe 56 and part of the pipe 8 described above.

The pair of evaporation and condensation side 4-way valves 33, 34 are respectively connected to the respective evaporation-condensation sections 12, 22 of the pair of adsorption vessels 10, 20 through the pipes 57 to 60. More specifically, one evaporation and condensation side 4-way valve 33 is connected to respective outlets of the second heating medium paths 12A, 22A through the pipes 57, 58, and the other evaporation and condensation side 4-way valve 34 is connected to respective inlets of the second heating medium paths 12A, 22A through the pipes 59, 60.

The pair of adsorption side 3-way valves 35, 36 are respectively connected to the pair of adsorption side 4-way valves 31, 32 through the pipes 61, 62, and are respectively connected to the interior heat exchanger 4 and the radiator 5 through the pipes 63 to 70. More specifically, one adsorption side 3-way valve 35 is connected to the adsorption side 4-way valve 32 through the pipe 61, is connected to an inlet of a heating medium path 4A of the interior heat exchanger 4 through the pipes 63, 64, and is connected to an inlet of a heating medium path 5A of the radiator 5 through the pipes 65, 66. The water pump 91 is provided partway along the pipe 61. The other adsorption side 3-way valve 36 is connected to the adsorption side 4-way valve 31 through the pipe 62, is connected to an outlet of the heating medium path 4A of the interior heat exchanger 4 through the pipes 67, 68, and is connected to an outlet of the heating medium path 5A of the radiator 5 through the pipes 69, 70.

The pair of condensation side 3-way valves 37, 38 are respectively connected to the pair of evaporation and condensation side 4-way valves 33, 34 through the pipes 71, 72, and are respectively connected to the interior heat exchanger 4 and the radiator 5 through the pipes 73, 64, 74, 66, 75, 68, 76, 70. More specifically, one condensation side 3-way valve 37 is connected to the evaporation and condensation side 4-way valve 33 through the pipe 71, is connected to an inlet of the heating medium path 4A of the interior heat exchanger 4 through the pipes 73, 64, and is connected to an inlet of the heating medium path 5A of the radiator 5 through the pipes 74, 66. The other condensation side 3-way valve 38 is connected to the evaporation and condensation side 4-way valve 34 through the pipe 72, is connected to the outlet of the heating medium path 4A of the interior heat exchanger 4 through the pipes 75, 68, and is connected to the outlet of the heating medium path 5A of the radiator 5 through the pipes 76, 70. The water pump 92 is provided partway along the pipe 72.

The pair of evaporation side 3-way valves 39, 40 are respectively connected to the pair of evaporation and condensation side 4-way valves 33, 34 through the pipes 77, 78, and are respectively connected to the interior heat exchanger 4 and the radiator 5 through the pipes 79, 64, 80, 65, 81, 68, 82, 70. More specifically, one evaporation side 3-way valve 39 is connected to the evaporation and condensation side 4-way valve 33 through the pipe 77, is connected to the inlet of the heating medium path 4A of the interior heat exchanger 4 through the pipes 79, 64, and is connected to the inlet of the heating medium path 5A of the radiator 5 through the pipes 80, 65. The other evaporation side 3-way valve 40 is connected to the evaporation and condensation side 4-way valve 34 through the pipe 78, is connected to the outlet of the heating medium path 4A of the interior heat exchanger 4 through the pipes 81, 68, and is connected to the outlet of the heating medium path 5A of the radiator 5 through the pipes 82, 70. The water pump 93 is provided partway along the pipe 78.

The bypass pipe 100 is connected parallel to the radiator 5, and configures a flow path providing a bypass for the heating medium flowing toward the radiator 5. More specifically, one end portion of the bypass pipe 100 is connected to the pipe 66 on the inlet side of the heating medium path 5A, and the other end portion of the bypass pipe 100 is connected to the pipe 70 through the flow rate control valve 101 on the outlet side of the heating medium path 5A. The flow rate control valve 101 is configured to control the flow rate of the heating medium flowing through the heating medium path 5A and the bypass pipe 100.

Respective drive portions of the 4-way valves 31 to 34, the 3-way valves 35 to 40, the water pumps 90 to 93, the flow rate control valve 101, the blower 116, and the air mixing damper 117, described above, are electrically connected to the controller, not illustrated in the drawings. The controller is electrically connected to an interior air sensor that detects the temperature inside the vehicle cabin, mi external air sensor that detects the temperature outside the vehicle cabin, a bypass temperature sensor that detects the temperature of the heating medium flowing through the bypass pipe 100, an operation mode switch, a temperature setting switch for setting the temperature inside the vehicle cabin, an airflow rate setting switch for setting the airflow rate of the blower 116, and the like (none of which are illustrated in the drawings).

When required to cool or required to heat the vehicle cabin interior, the controller switches the flow paths through the 4-way valves 31 to 34 to alternate between the respective states illustrated by solid lines and states illustrated by dashed lines in FIG. 1 to FIG. 3 at a specific time interval. This thereby interchanges high temperature and cool temperature heating medium, and interchanges cool temperature and cold temperature heating medium, to and from the pair of adsorption vessels 10, 20. This switching is performed in a state in which the engine 2 and the water pumps 90 to 93 are operated.

The controller switches the flow path through the 3-way valves 35 to 40 to the state illustrated in FIG. 1 when required to cool the vehicle cabin interior (when required to cool). The state illustrated in FIG. 1 corresponds to a "cooling mode" according to the present invention. The controller switches the flow path through the 3-way valves 35 to 40 to the state illustrated in FIG. 2 when required to heat the vehicle cabin interior (when required to heat). The state illustrated in FIG. 2 corresponds to a "first heating mode" according to the present invention. The controller switches the flow path through the 3-way valves 35 to 40 to the state illustrated in FIG. 3 when there is a strong requirement to heat the vehicle cabin interior, and specific conditions have been satisfied. The state illustrated in FIG. 3 corresponds to a "second heating mode" according to the present invention.

In the cooling mode illustrated in FIG. 1, out of the adsorption sections 11, 21, the adsorption section on a desorption process side (the adsorption section 21 in FIG. 1) and the engine 2 are connected together through the pair of adsorption side 4-way valves 31, 32. Accordingly, high temperature heating medium (for example, at approximately 90° C. to trigger desorption: the same applies below) is circulated between the adsorption section on the desorption process side and the engine 2 (see the arrows F21 in FIG. 1).

In the cooling mode, out of the adsorption sections 11, 21, the adsorption section on an adsorption process side (the adsorption section 11 in FIG. 1) and the radiator 5 are connected together through the pair of adsorption side 4-way valves 31, 32 and the pair of adsorption side 3-way valves 35, 36, and out of the evaporation-condensation sections 12, 22, the evaporation-condensation section on the desorption process side (the evaporation-condensation section 22 in FIG. 1) and the radiator 5 are connected through the pair of evaporation and condensation side 4-way valves 33, 34 and the pair of condensation side 3-way valves 37, 38. Accordingly, cool temperature heating medium (for example, at approximately 40° C., this being higher than atmospheric temperature: the same applies below) is circulated between the adsorption section on the adsorption process side and the radiator 5, and between the evaporation-condensation section on the desorption process side and the radiator 5 (see the arrows F11 and the arrows F22 in FIG. 1).

Moreover, in the cooling mode, out of the evaporation-condensation sections 12, 22, the evaporation-condensation section on the adsorption process side (the evaporation-condensation section 12 in FIG. 1) and the interior heat exchanger 4 are connected together through the pair of evaporation and condensation side 4-way valves 33, 34 and the pair of evaporation side 3-way valves 39, 40. Accordingly, cold temperature heating medium (for example, at approximately 10° C., this being colder than the temperature inside the vehicle: the same applies below) is circulated between the evaporation-condensation section on the adsorption process side and the interior heat exchanger 4 (see the arrows F12 in FIG. 1).

In the first heating mode illustrated in FIG. 2, similarly to in the cooling mode, out of the adsorption sections 11, 21, the adsorption section on the desorption process side (the adsorption section 21 in FIG. 2) and the engine 2 are connected together through the pair of adsorption side 4-way valves 31, 32. Accordingly, high temperature heating medium circulates between the adsorption section on the desorption process side and the engine 2 (see the arrows F21 in FIG. 2).

In the first heating mode, out of the evaporation-condensation sections 12, 22, the evaporation-condensation section on the adsorption process side (the evaporation-condensation section 12 in FIG. 2) and the radiator 5 are connected together through the pair of evaporation and condensation side 4-way valves 33, 34 and the pair of evaporation side 3-way valves 39, 40, and out of the evaporation-condensation sections 12, 22, the evaporation-condensation section on the desorption process side (the evaporation-condensation section 22 in FIG. 2) and the radiator 5 are connected together through the pair of evaporation and condensation side 4-way valves 33, 34 and the pair of condensation side 3-way valves 37, 38. Accordingly, cold temperature and cool temperature heating medium circulates between the evaporation-condensation section on the adsorption process side and the radiator 5, and the evaporation-condensation section on the desorption process side and the radiator 5, respectively (see the arrows F12 and the arrows F22 in FIG. 2).

Moreover, in the first heating mode, out of the adsorption sections 11, 21, the adsorption section on the adsorption process side (the adsorption section 11 in FIG. 2) and the interior beat exchanger 4 are connected together through the pair of adsorption side 4-way valves 31, 32 and the pair of adsorption side 3-way valves 35, 36. Accordingly, cool temperature heating medium circulates between the adsorption section on the adsorption process side and the interior heat exchanger 4 (see the arrows F11 in FIG. 2).

In the second heating mode illustrated in FIG. 3, similarly to in the cooling mode, out of the adsorption sections 11, 21, the adsorption section on the desorption process side (the adsorption section 21 in FIG. 3) and the engine 2 are connected together through the pair of adsorption side 4-way valves 31, 32. Accordingly, high temperature heating medium circulates between the adsorption section on the desorption process side and the engine 2 (see the arrows F21 in FIG. 3).

In the second heating mode, out of the evaporation-condensation sections 12, 22, the evaporation-condensation section on the adsorption process side (the evaporation-condensation section 12 in FIG. 3) and the radiator 5 are connected together through the pair of evaporation and condensation side 4-way valves 33, 34 and the pair of evaporation side 3-way valves 39, 40. Accordingly, cold temperature heating medium circulates between the evaporation-condensation section on the adsorption process side and the radiator 5 (see the arrows F12 in FIG. 3).

Moreover, in the second heating mode, out of the adsorption sections 11, 21, the adsorption section on the adsorption process side (the adsorption section 11 in FIG. 3) and the interior heat exchanger 4 are connected together through the pair of adsorption side 4-way valves 31, 32 and the pair of adsorption side 3-way valves 35, 36, and out of the evaporation-condensation sections 12, 22, the evaporation-condensation section on the desorption process side (the evaporation-condensation section 22 in FIG. 3) and the interior heat exchanger 4 are connected together through the pair of evaporation and condensation side 4-way valves 33, 34 and the pair of condensation side 3-way valves 37, 38. Accordingly, cool temperature heating medium circulates between the adsorption section on the adsorption process side and the interior heat exchanger 4, and between the evaporation-condensation section on the desorption process side and the interior heat exchanger 4 (see the arrows F11 and the arrows F22 in FIG. 3).

Note that switching from the first heating mode to the second heating mode by the controller is performed when the blower airflow rate is at its maximum and the temperature outside the vehicle cabin is a specific temperature To (for example 8° C.) or higher. In a state in which either of these conditions is not satisfied, the controller switches from the second heating mode to the first heating mode. These conditions are stipulated as conditions for the second heating mode, namely conditions under which both heat of adsorption and heat of condensation can be utilized for heating. Namely, the controller is configured so as to switch from the first heating mode to the second heating mode in response to a requirement for rapid heating, such as when the blower airflow rate is turned up to its maximum, in a case in which the cold temperature heating medium, this being a medium for heat of vaporization, in the radiator 5 outside the vehicle cabin can absorb heat from external air. The controller is also configured to switch from the second heating mode to the first heating mode when the radiator 5 needs to receive heat of vaporization, and the temperature outside the vehicle cabin is below the specific temperature To.

Conditions for controlling the flow rate control valve 101 with the controller are determined by the temperature outside the vehicle cabin, operation conditions of the vehicular adsorption type air conditioning device 11, and the temperature of the heating medium flowing through the bypass pipe 100. In the first heating mode and the second heating mode, the controller sends the heating medium to the radiator 5 in a state in which the temperature outside the vehicle cabin is lower than that in the cooling mode, and in the second heating mode, the controller sends the heating medium to the radiator 5 in a state in which the temperature outside the vehicle cabin is the specific temperature To or higher. Namely, in the cooling mode, being able to release heat from the cool temperature heating medium, this being a medium for heat of adsorption and a medium for heat of condensation, in the radiator 5 is a condition for sending the heating medium to the radiator 5. In the second heating mode, the cold temperature heating medium, this being a medium for heat of vaporization, being able to absorb heat in the radiator 5 is a condition for sending the heating medium to the radiator 5.

Operation and Advantageous Effects

Next, explanation follows regarding operation and advantageous effects of the first exemplary embodiment.

In the first exemplary embodiment, the high temperature heating medium circulates between the heater core 3 and the engine 2 due to providing the heating flow path section 6. Accordingly, waste heat of the engine 2 can be utilized to heat the vehicle cabin. Moreover, in the present exemplary embodiment, the flow path system 30 that interchanges the heating medium between: the engine 2, the radiator 5, and the interior heat exchanger 4; and the pair of adsorption vessels 10, 20, is capable of switching between the cooling mode, the first heating mode, and the second heating mode.

In the cooling mode, the heating medium circulates between the evaporation-condensation section on the adsorption process side out of the evaporation-condensation sections 12, 22, and the interior heat exchanger 4. This thereby enables the latent heat of evaporation of the refrigerant to be utilized to cool the vehicle cabin. In the first heating mode, the heating medium circulates between the adsorption section on the adsorption process side out of the adsorption sections 11, 21, and the interior heat exchanger 4. This thereby enables the heat of adsorption of the refrigerant to be employed to heat the vehicle cabin. In the second heating mode, the heating medium circulates between the adsorption section on the adsorption process side out of the adsorption sections 11, 21, and the interior heat exchanger 4, and between the evaporation-condensation section on the desorption process side out of the evaporation-condensation sections 12, 22, and the interior heat exchanger 4. This thereby enables the heat of adsorption and the heat of condensation of the refrigerant to be utilized to heat the vehicle cabin.

In this manner, according to the first exemplary embodiment, not only waste heat of the high temperature heat source, but also heat of adsorption and heat of condensation, can be utilized as auxiliary heat sources to heat the vehicle cabin. This thereby enables heating efficiency to be improved. Moreover, in cases in which a greater source of heat is required, both heat of adsorption and heat of condensation can be utilized in heating, thereby enabling the heating ability to be increased in comparison to cases in which only one out of heat of adsorption or heat of condensation is utilized in heating. Moreover, in the first exemplary embodiment, high temperature waste heat of the engine 2 can be used, and separately output heat of adsorption, heat of condensation, and heat of vaporization, thereby enabling heat distribution to be realized easily as needed.

In the first heating mode, in principle, the input heat of the high temperature waste heat and the output heat of the heating are equivalent heat amounts, enabling high heating performance to be realized. Namely, the input heat of the high temperature waste heat is the heat amount from the high temperature heat source consumed in adsorption, namely the heat amount required for desorption, and is the heat amount to transform the adsorbed refrigerant (water in this example) into water vapor. The output heat of the heating in the first heating mode is the amount of heat of adsorption from adsorbing the water vapor. Adsorption and desorption are reversible reactions, with chemical changes occurring between the two states of water vapor and water in an adsorbed state, and so the amount of heat absorbed in desorption and the amount of heat generated in adsorption are equivalent heat amounts in opposite directions.

In the flow path system 30 of the first exemplary embodiment, the 3-way valves 35 to 40 are disposed further to the side of the interior heat exchanger 4 and the radiator 5 than the 4-way valves 31 to 34. Accordingly, switching of the flow paths by the 3-way valves 35 to 40 does not affect heat loss occurring due to interchanging the high temperature, the cool temperature, and the cold temperature heating medium to and from the adsorption vessels 10, 20 using the 4-way valves 31 to 34. This thereby enables efficient output to be obtained.

In the first exemplary embodiment, in the radiator 5 outside the vehicle cabin, the cold temperature heating medium (heat of vaporization) can absorb heat from external air, and the first heating mode can be switched to the second heating mode in response to a requirement for rapid heating, such as when the blower airflow rate is turned up to its maximum. This thereby enables heating with high responsiveness to be realized. Moreover, the second heating mode may be switched to the first heating mode in cases in which the cold temperature heating medium in the radiator 5 need to absorb heat, and the temperature outside the vehicle cabin is below the specific temperature To. This thereby enables operational reliability to be increased.

In the first exemplary embodiment, the flow path system 30 is configured including the two pairs of (four) 4-way valves 31 to 34 connected to the pair of adsorption vessels 10, 20, and the three pairs of (six) 3-way valves 35 to 40 connecting between the 4-way valves 31 to 34, and the interior heat exchanger 4 and the radiator 5. Two out of the four 4-way valves 31 to 34 are connected to the engine 2. This thereby enables the heating medium to be interchanged between the pair of adsorption vessels 10, 20, and the engine 2, the interior heat exchanger 4, and the radiator 5. Moreover, this enables switching between the cooling mode, the first heating mode, and the second heating mode described above. This thereby enables the flow path system to be achieved with a simple configuration.

In the first exemplary embodiment, the flow rates of the heating medium flowing through the radiator 5 and the bypass pipe 100 are controlled (regulated) by the flow rate control valve 101, thereby enabling the flow rate of the heating medium that performs heat exchange with the external air in the radiator 5 to be controlled. This thereby enables the heat release amount or heat absorption amount of the heating medium in the radiator 5 to be regulated to appropriate amounts for each mode. Namely, in the first heating mode and the second heating mode, the heating medium is sent to the radiator 5 in a state in which the temperature outside the vehicle cabin is lower than that in the cooling mode, and in the second heating mode, the heating medium is sent to the radiator 5 in a state in which the temperature outside the vehicle cabin is the specific temperature To or higher. This thereby enables stable cooling output in the cooling mode, and enables stable utilization of heat of adsorption and heat of condensation in the second heating mode. This accordingly contributes to improving the cooling and heating performance.

In the first exemplary embodiment, the interior heat exchanger 4 that introduces heat of vaporization, heat of adsorption, and heat of condensation into the vehicle cabin is disposed inside the casing 111 of the interior air conditioning unit 110, between the blower 116 and the heater core 3. Accordingly, in the cooling mode, cooling and dehumidification can be performed similarly to in related vehicle air conditioning devices. In the heating modes, heating performance is improved by introducing preheated air into the heater core 3 using the interior heat exchanger 4. The burden on the heater core 3 is also lessened, thereby contributing to a reduction in size of the heater core 3.

Note that in the first exemplary embodiment, configuration is made in which in the first heating mode (see FIG. 2), the heating medium is circulated between the adsorption section on the adsorption process side out of the adsorption sections 11, 21 (the adsorption section 11 in FIG. 2), and the interior heat exchanger 4. However, the present invention is not limited thereto. Namely, as in a modified example of the first heating mode illustrated in FIG. 5, configuration may be made in which the heating medium circulates between the evaporation-condensation section on the desorption process side out of the evaporation-condensation sections 12, 22 (the evaporation-condensation section 22 in FIG. 5), and the interior heat exchanger 4 (see the arrows F22 in FIG. 5). In this modified example of the first heating mode, the directions of the flow paths through the pair of adsorption side 3-way valves 35, 36 and the direction of the flow paths through the pair of condensation side 3-way valves 37, 38 are the reverse of those illustrated in FIG. 2. In this modified example of the first heating mode, heat of condensation of the refrigerant can be utilized as an auxiliary heat source to heat the vehicle cabin. However, since the amount of heat of adsorption is greater than the amount of heat of condensation in the relationship between the adsorbent and the refrigerant employed in the vehicular adsorption type air conditioning device 1, utilizing the heat of adsorption as an auxiliary heat source for heating is more efficient.

Next, explanation follows regarding other exemplary embodiments of the present invention. Note that configurations and operation basically the same as those of the first exemplary embodiment described above are allocated the same reference numerals as in the first exemplary embodiment described above, and explanation thereof is omitted.

Second Exemplary Embodiment

As illustrated in FIG. 6 to FIG. 9, in a vehicular adsorption type air conditioning device 120 according to a second exemplary embodiment of the present invention, configuration of a flow path system 122 differs from that of the flow path system 30 according to the first exemplary embodiment described above. In the flow path system 122, the evaporation side 3-way valves 39, 40, and the pipes 79 to 82 according to the first exemplary embodiment described above are omitted. In the flow path system 122, an end portion of the pipe 77 on the opposite side to the evaporation and condensation side 4-way valve 33 is connected to the pipe 66 through the pipe 74, and an end portion of the pipe 78 on the opposite side to the evaporation and condensation side 4-way valve 34 is connected to the pipe 70 through the pipe 76.

Figure 6:
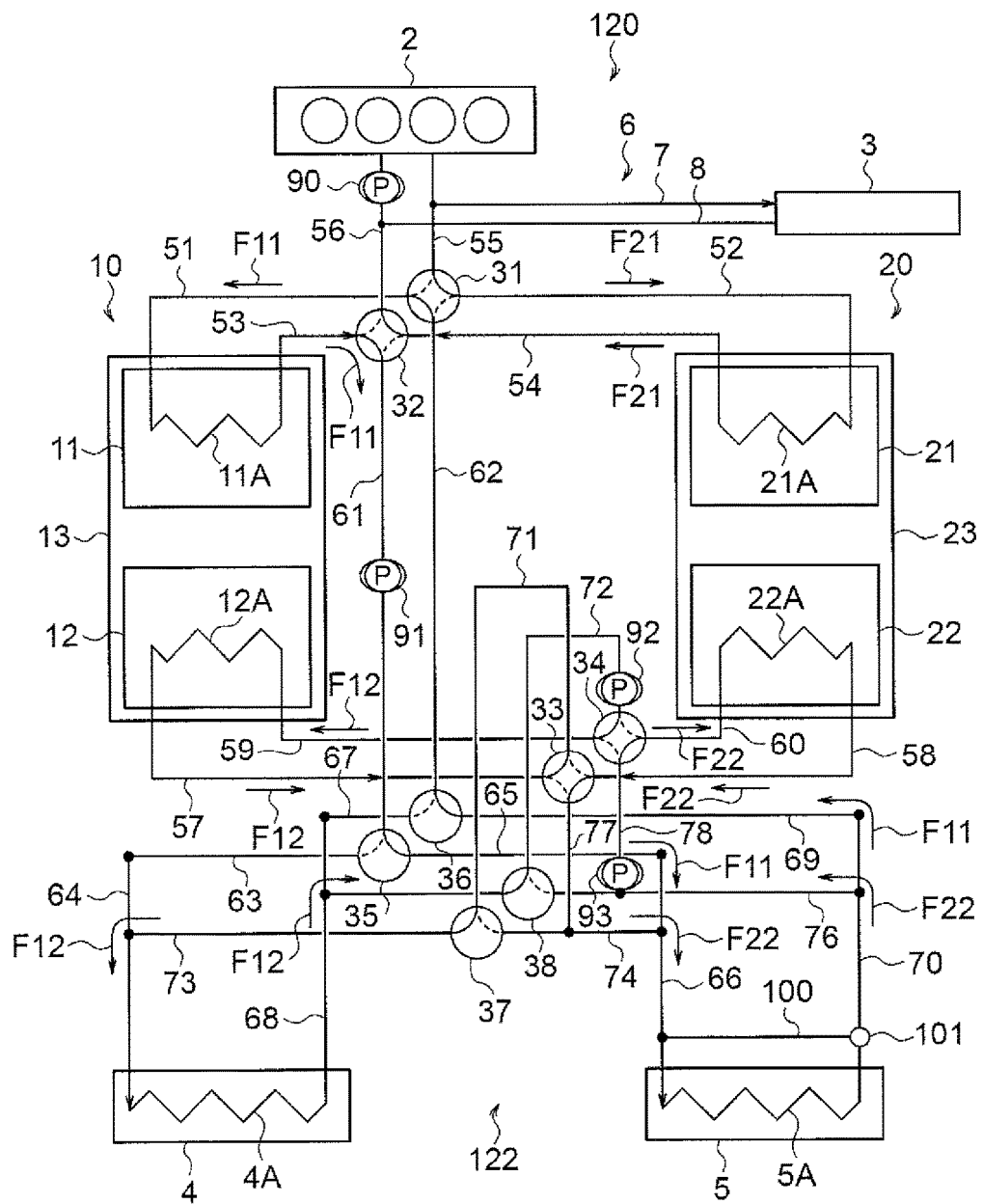
FIG. 6 is a schematic diagram illustrating a cooling mode in a vehicular adsorption type air conditioning device according to a second exemplary embodiment of the present invention.
Figure 7:
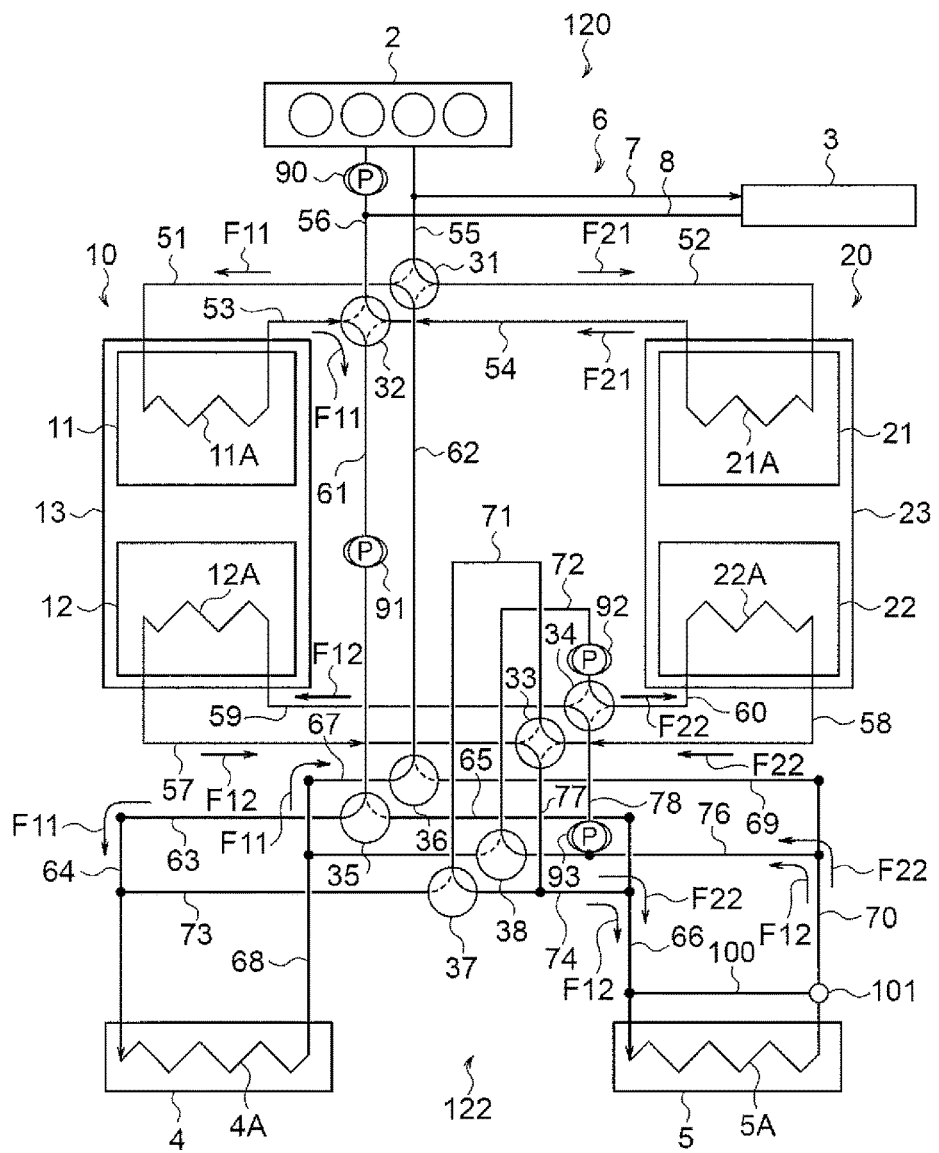
FIG. 7 is a schematic diagram corresponding to FIG. 6, illustrating a first heating mode of a vehicular adsorption type air conditioning device according to the second exemplary embodiment.
Figure 8:
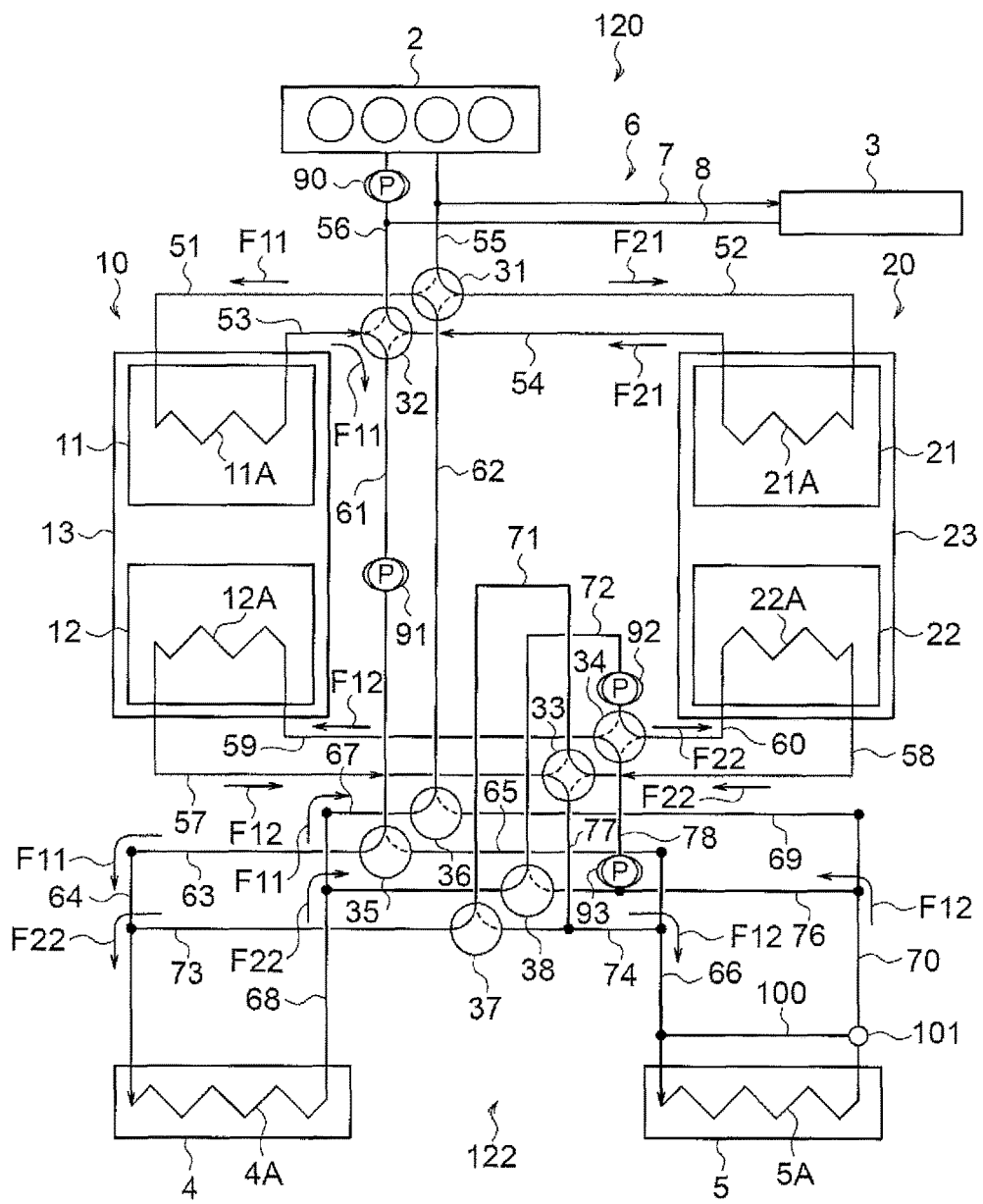
FIG. 8 is a schematic diagram corresponding to FIG. 6, illustrating a second heating mode of a vehicular adsorption type air conditioning device according to the second exemplary embodiment.
Figure 9:
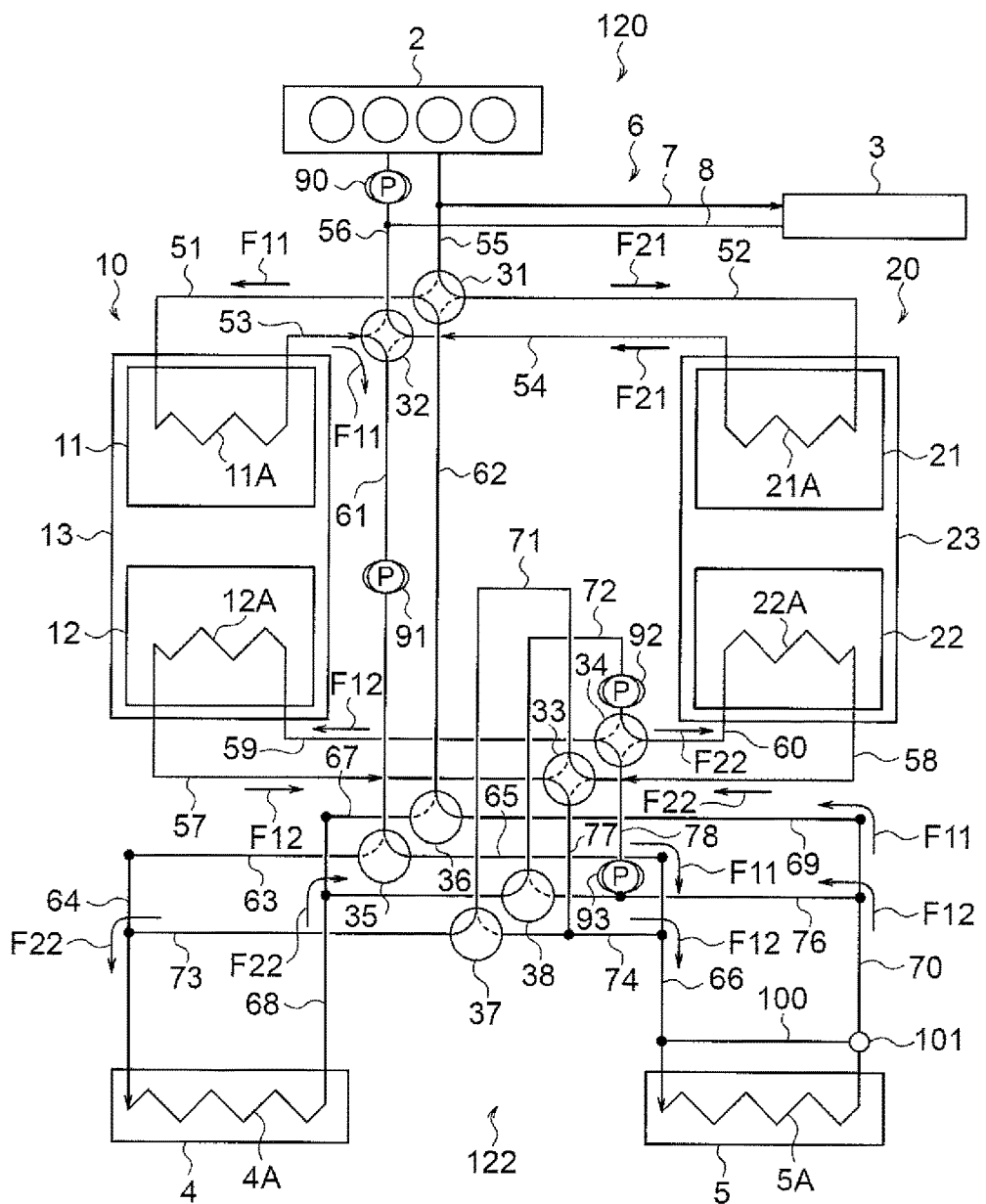
FIG. 9 is a schematic diagram corresponding to FIG. 6, illustrating a modified example of a first heating mode of a vehicular adsorption type air conditioning device according to the second exemplary embodiment.

In the second exemplary embodiment, the state illustrated in FIG. 6 corresponds to the "cooling mode", the state illustrated in FIG. 7 corresponds to the "first heating mode", and the state illustrated in FIG. 8 corresponds to the "second heating mode". Specific explanation follows thereof.

In the cooling mode illustrated in FIG. 6, out of the adsorption sections 11, 21, the adsorption section on the desorption process side (the adsorption section 21 in FIG. 6) and the engine 2 are connected together through the pair of adsorption side 4-way valves 31, 32. Accordingly, the high temperature heating medium circulates between the adsorption section on the desorption process side and the engine 2 (see the arrows F21 in FIG. 6). This point is also common to the first heating mode and the second heating mode.

In the cooling mode, out of the adsorption sections 11, 21, the adsorption section on the adsorption process side (the adsorption section 11 in FIG. 6) and the radiator 5 are connected together through the pair of adsorption side 4-way valves 31, 32 and the pair of adsorption side 3-way valves 35, 36, and out of the evaporation-condensation sections 12, 22, the evaporation-condensation section on the desorption process side (the evaporation-condensation section 22 in FIG. 6) and the radiator 5 are connected together through the pair of evaporation and condensation side 4-way valves 33, 34. Accordingly, cool temperature heating medium circulates between the adsorption section on the adsorption process side and the radiator 5, and between the evaporation-condensation section on the desorption process side and the radiator 5 (see the arrows F11 and the arrows F22 in FIG. 6).

Moreover, in the cooling mode, out of the evaporation-condensation sections 12, 22, the evaporation-condensation section on the adsorption process side (the evaporation-condensation section 12 in FIG. 6) and the interior heat exchanger 4 are connected together through the pair of evaporation and condensation side 4-way valves 33, 34 and the pair of condensation side 3-way valves 37, 38. Accordingly, cold temperature heating medium circulates between the evaporation-condensation section on the adsorption process side and the interior heat exchanger 4 (see the arrows F12 in FIG. 6).

In the first heating mode illustrated in FIG. 7, out of the evaporation-condensation sections 12, 22, the evaporation-condensation section on the adsorption process side (the evaporation-condensation section 12 in FIG. 7) and the radiator 5 are connected together through the pair of evaporation and condensation side 4-way valves 33, 34, and out of the evaporation-condensation sections 12, 22, the evaporation-condensation section on the desorption process side (the evaporation-condensation section 22 in FIG. 7) and the radiator 5 are connected together through the pair of evaporation and condensation side 4-way valves 33, 34 and the pair of condensation side 3-way valves 37, 38. Accordingly, cold temperature and cool temperature heating medium circulates between the evaporation-condensation section on the adsorption process side and the radiator 5, and between the evaporation-condensation section on the desorption process side and the radiator 5 (see the arrows F12 and the arrows F22 in FIG. 7).

In the first heating mode, out of the adsorption sections 11, 21, the adsorption section on the adsorption process side (the adsorption section 11 in FIG. 7) and the interior heat exchanger 4 are connected together through the pair of adsorption side 4-way valves 31, 32 and the pair of adsorption side 3-way valves 35, 36. Accordingly, cool temperature heating medium circulates between the adsorption section on the adsorption process side and the interior heat exchanger 4 (see arrows F11 in FIG. 7).

In the second heating mode illustrated in FIG. 8, out of the evaporation-condensation sections 12, 22, the evaporation-condensation section on the adsorption process side (the evaporation-condensation section 12 in FIG. 8) and the radiator 5 are connected together through the pair of evaporation and condensation side 4-way valves 33, 34. Accordingly, cold temperature heating medium circulates between the evaporation-condensation section on the adsorption process side and the radiator 5 (see the arrows F12 in FIG. 8).

In the second heating mode, out of the adsorption sections 11, 21, the adsorption section on the adsorption process side (the adsorption section 11 in FIG. 8) and the interior heat exchanger 4 are connected together through the pair of adsorption side 4-way valves 31, and the pair of adsorption side 3-way valves 35, 36, and out of the evaporation-condensation sections 12, 22, the evaporation-condensation section on the desorption process side (the evaporation-condensation section 22 in FIG. 8) and the interior heat exchanger 4 are connected together through the pair of evaporation and condensation side 4-way valves 33, 34 and the pair of condensation side 3-way valves 37, 38. Accordingly, cool temperature heating medium circulates between the adsorption section on the adsorption process side and the interior heat exchanger 4, and between the evaporation-condensation section on the desorption process side and the interior heat exchanger 4 (see the arrows F11 and the arrows F22 in FIG. 8).

With the exception of the above configurations, the second exemplary embodiment is configured similarly to the first exemplary embodiment described above. In the first heating mode of the second exemplary embodiment, the heating medium circulates between the adsorption section on the adsorption process side out of the adsorption sections 11, 21, and the interior heat exchanger 4. This thereby enables the heat of adsorption of the refrigerant to be utilized to heat the vehicle cabin. In the second heating mode, the heating medium circulates between the adsorption section on the adsorption process side out of the adsorption sections 11, 21, and the interior heat exchanger 4, and between the evaporation-condensation section on the desorption process side out of the evaporation-condensation sections 12, 22, and the interior heat exchanger 4. This thereby enables the heat of adsorption and the heat of condensation of the refrigerant to be utilized to heat the vehicle cabin. This thereby enables heating efficiency to be improved, similarly to in the first exemplary embodiment described above. Moreover, in the second exemplary embodiment, the evaporation side 3-way valves 39, 40 and the pipes 79 to 82 according to the first exemplary embodiment described above are omitted, thereby enabling the flow path system to be achieved with an even simpler configuration.

Note that in the second exemplary embodiment, in the first heating mode (see FIG. 7) configuration is made in which the heating medium circulates between the adsorption section on the adsorption process side out of the adsorption sections 11, 21 (the adsorption section 11 in FIG. 7), and the interior heat exchanger 4. However, the present invention is not limited thereto. Namely, as in a modified example of the first heating mode illustrated in FIG. 9, configuration may be made in which the heating medium circulates between the evaporation-condensation section on the desorption process side out of the evaporation-condensation sections 12, 22 (the evaporation-condensation section 22 in FIG. 9), and the interior heat exchanger 4 (see the arrows F22 in FIG. 9). In this modified example of the first heating mode, the directions of the flow paths through the pair of adsorption side 3-way valves 35, 36 and the flow paths through the pair of condensation side 3-way valves 37, 38 are the reverse of those in FIG. 7. This modified example of the first heating mode enables the heat of condensation of the refrigerant to be utilized as an auxiliary heat source to heat the vehicle cabin.

Third Exemplary Embodiment

As illustrated in FIG. 10 to FIG. 13, in a vehicular adsorption type air conditioning device 130 according to a third exemplary embodiment of the present invention, configuration of a flow path system 132 differs from that of the flow path system 30 according to the first exemplary embodiment described above. In the flow path system 132, the condensation side 3-way valves 37, 38, the evaporation side 3-way valves 39, 40, and the pipes 73 to 82 according to the first exemplary embodiment described above are omitted. In the flow path system 132, an end portion of the pipe 71 on the opposite side to the evaporation and condensation side 4-way valve 33 is connected to the pipe 64, and an end portion of the pipe 72 on the opposite side to the evaporation and condensation side 4-way valve 34 is connected to the pipe 68. Moreover, in the flow path system 132, an end portion of the pipe 77 on the opposite side to the evaporation and, condensation side 4-way valve 33 is connected to the pipe 66, and an end portion of the pipe 78 on the opposite side to the evaporation and condensation side 4-way valve 34 is connected to the pipe 70.

Figure 10:
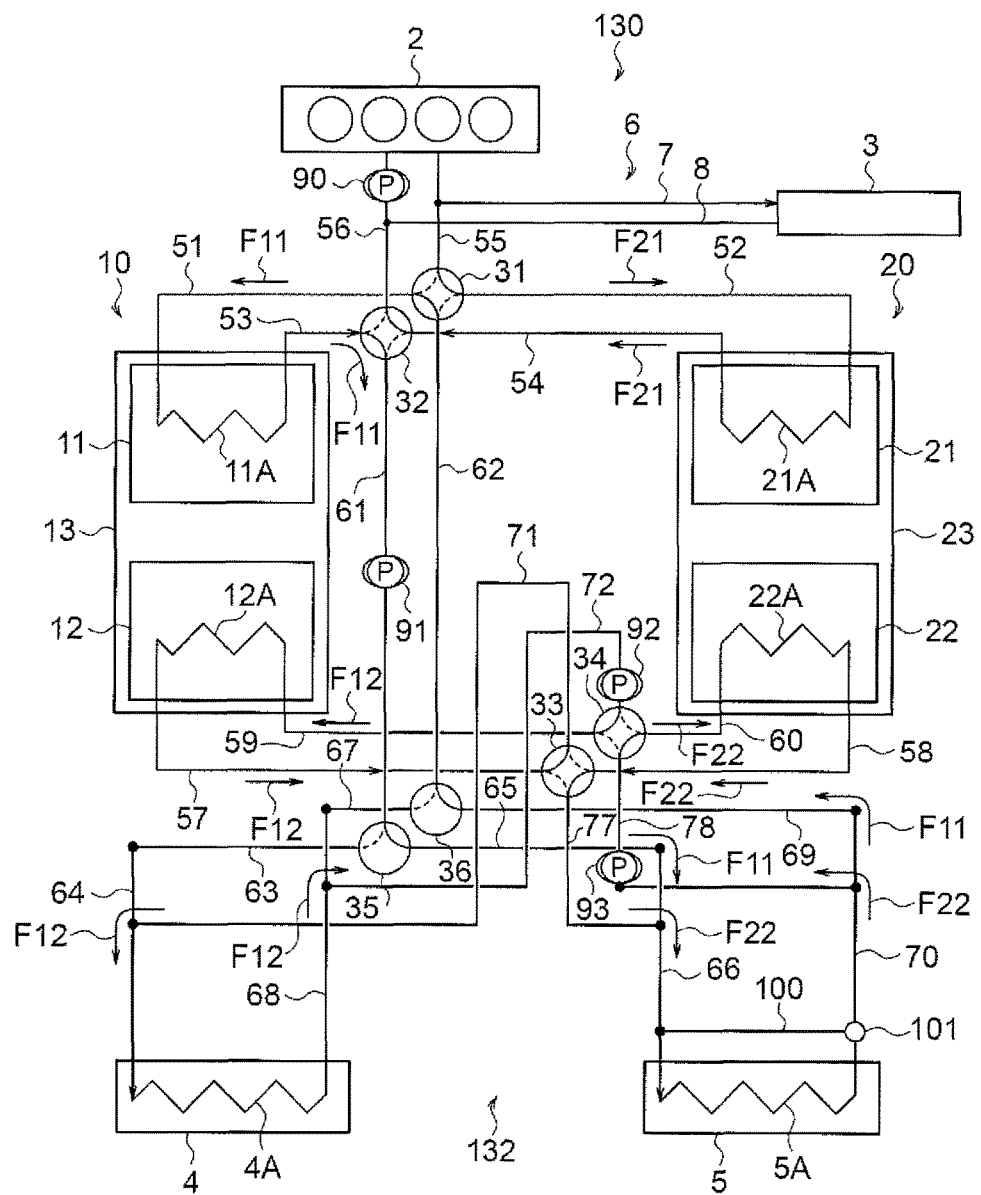
FIG. 10 is a schematic diagram illustrating a cooling mode in a vehicular adsorption type air conditioning device according to a third exemplary embodiment of the present invention.
Figure 11:
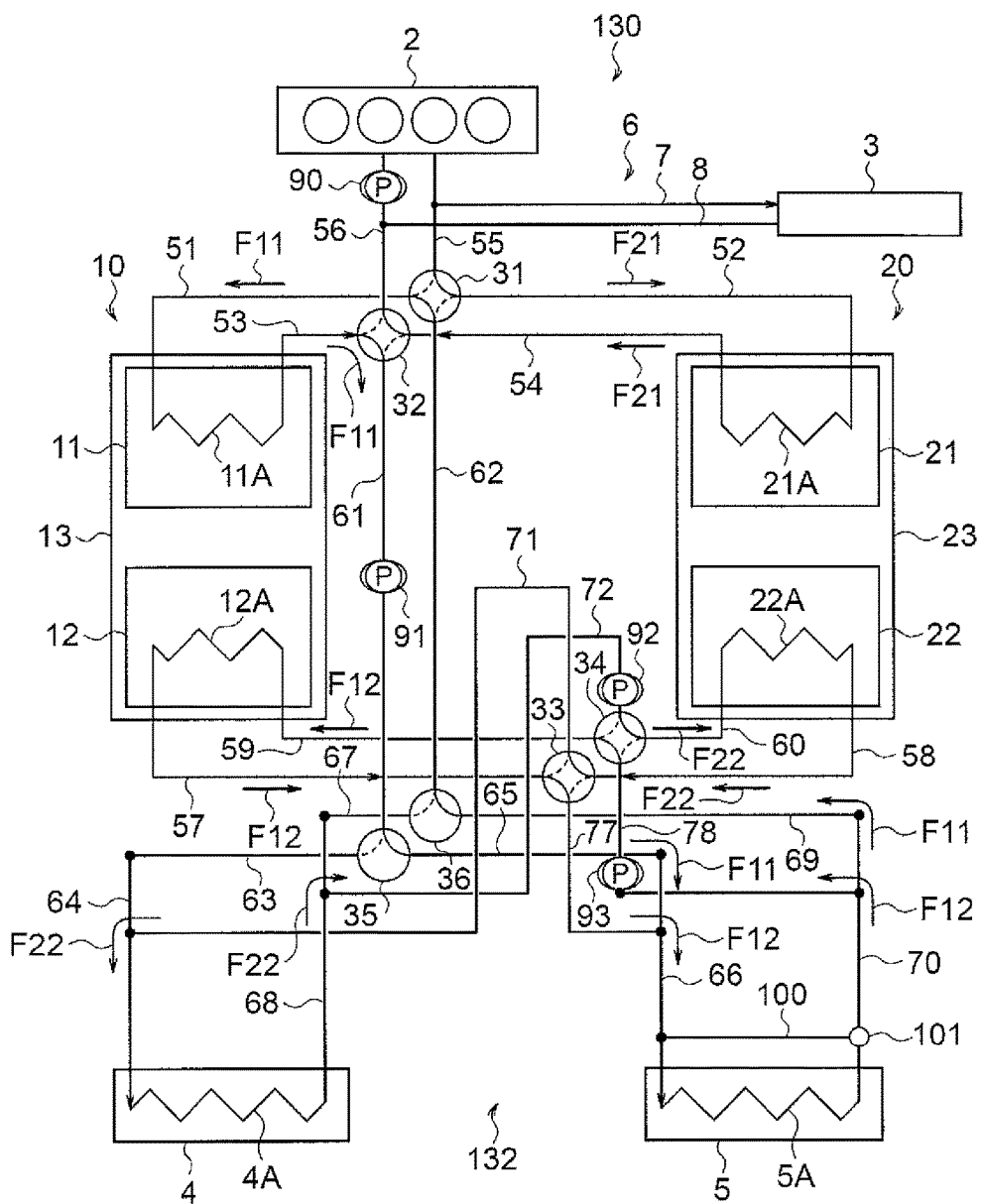
FIG. 11 is a schematic diagram corresponding to FIG. 10, illustrating a first heating mode of a vehicular adsorption type air conditioning device according to the third exemplary embodiment.
Figure 12:
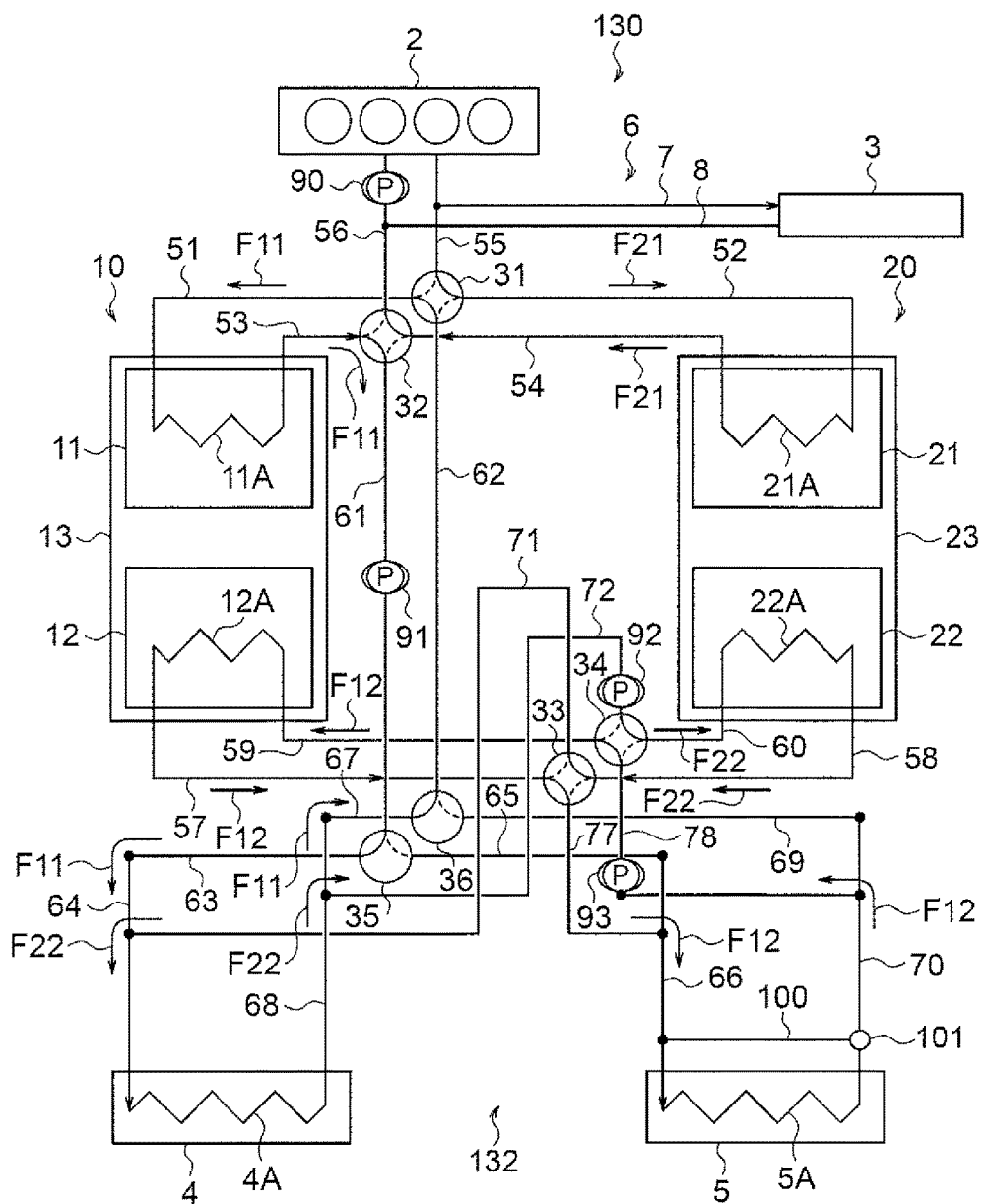
FIG. 12 is a schematic diagram corresponding to FIG. 10, illustrating a second heating mode of a vehicular adsorption type air conditioning device according to the third exemplary embodiment.
Figure 13:
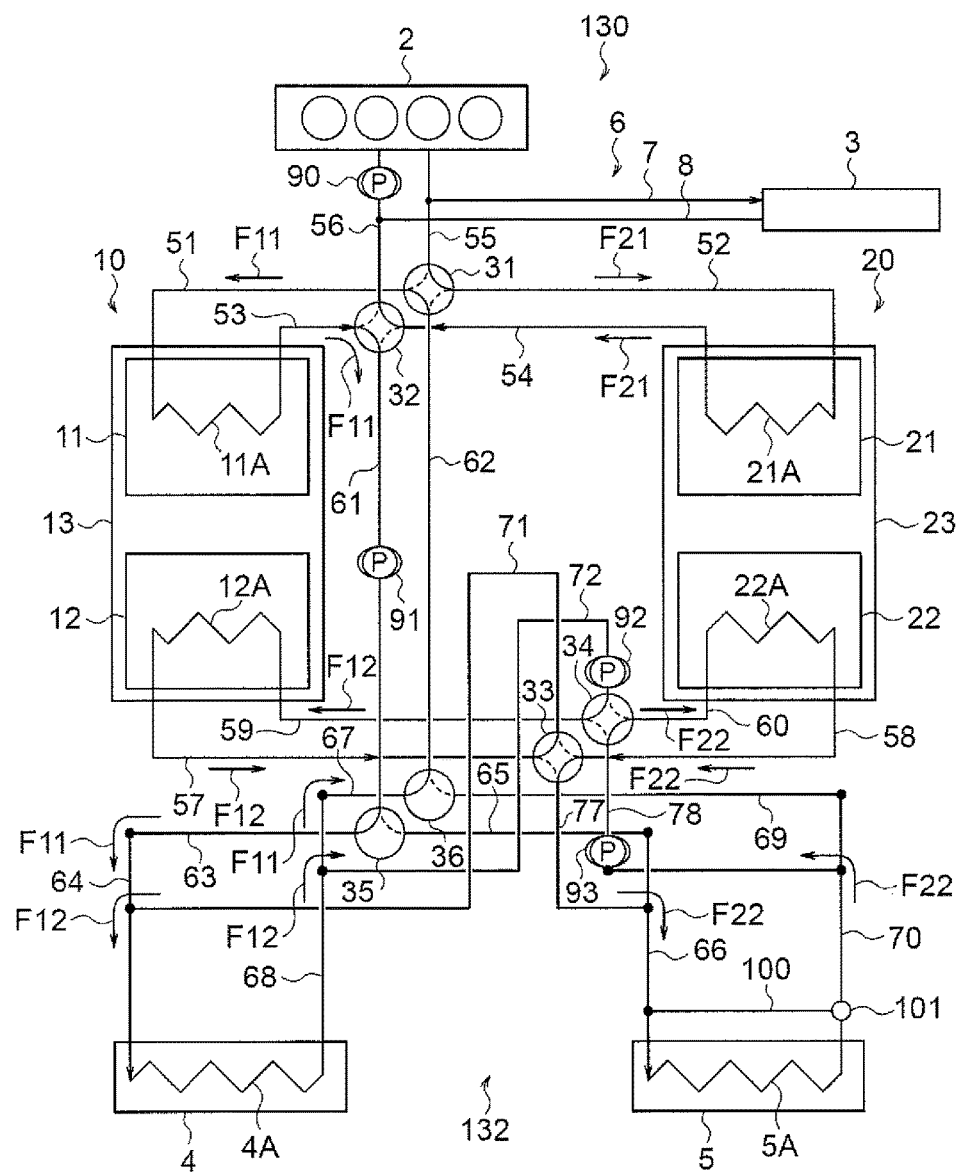
FIG. 13 is a schematic diagram corresponding to FIG. 10, illustrating a modified example of a first heating mode of a vehicular adsorption type air conditioning device according to the third exemplary embodiment.

In the third exemplary embodiment, the state illustrated in FIG. 10 corresponds to the "cooling mode", the state illustrated in FIG. 11 corresponds to the "first heating mode", and the state illustrated in FIG. 12 corresponds to the "second heating mode". Specific explanation follows thereo.

In the cooling mode illustrated in FIG. 10, out of the adsorption sections 11, 21, the adsorption section on the desorption process side (the adsorption section 21 in FIG. 10) and the engine 2 are connected together through the pair of adsorption side 4-way valves 31, 32. Accordingly, the high temperature heating medium circulates between the adsorption section on the desorption process side and the engine 2 (see the arrows F21 in FIG. 10). This point is also common to the first heating mode and the second heating mode.

In the cooling mode, out of the adsorption sections 11, 21, the adsorption section on the adsorption process side (the adsorption section 11 in FIG. 10) and the radiator 5 are connected together through the pair of adsorption side 4-way valves 31, 32 and the pair of adsorption side 3-way valves 35, 36, and out of the evaporation-condensation sections 12, 22, the evaporation-condensation section on the desorption process side (the evaporation-condensation section 22 in FIG. 10) and the radiator 5 are connected together through the pair of evaporation and condensation side 4-way valves 33, 34. Accordingly, cool temperature heating medium circulates between the adsorption section on the adsorption process side and the radiator 5, and between the evaporation-condensation section on the desorption process side and the radiator 5 (see the arrows F11 and the arrows F22 in FIG. 10).

Moreover, in the cooling mode, out of the evaporation-condensation sections 12, 22, the evaporation-condensation section on the adsorption process side (the evaporation-condensation section 12 in FIG. 10) and the interior heat exchanger 4 are connected together through the pair of evaporation and condensation side 4-way valves 33, 34. Accordingly, cold temperature heating medium circulates between the evaporation-condensation section on the adsorption process side and the interior heat exchanger 4 (see the arrows F12 in FIG. 10).

In the first heating mode illustrated in FIG. 11, out of the adsorption sections 11, 21, the adsorption section on the adsorption process side (the adsorption section 11 in FIG. 11) and the radiator 5 are connected together through the pair of adsorption side 4-way valves 31, 32 and the pair of adsorption side 3-way valves 35, 36, and out of the evaporation-condensation sections 12, 22, the evaporation-condensation section on the adsorption process side (the evaporation-condensation section 12 in FIG. 11) and the radiator 5 are connected together through the pair of evaporation and condensation side 4-way valves 33, 34. Accordingly, cold temperature and, cool temperature heating medium circulates between the adsorption section on the adsorption process side and the radiator 5, and between the evaporation-condensation section on the adsorption process side and the radiator 5, respectively (see the arrows F11 and the arrows F12 in FIG. 11).

In the first heating mode, out of the evaporation-condensation sections 12, 22, the evaporation-condensation section on the desorption process side (the evaporation-condensation section 22 in FIG. 11) and the interior heat exchanger 4 are connected together through the pair of evaporation and condensation side 4-way valves 33, 34. Accordingly, cool temperature heating medium circulates between the evaporation-condensation section on the desorption process side and the interior heat exchanger 4 (see the arrows F22 in FIG. 11).

In the second heating mode illustrated in FIG. 12, out of the evaporation-condensation sections 12, 22, the evaporation-condensation section on the adsorption process side (the evaporation-condensation section 12 in FIG. 12) and the radiator 5 are connected together through the pair of evaporation and condensation side 4-way valves 33, 34. Accordingly, cold temperature heating medium circulates between the evaporation-condensation section on the adsorption process side and the radiator 5 (see the arrows F12 in FIG. 12).

In the second heating mode, out of the adsorption sections 11, 21, the adsorption section on the adsorption process side (the adsorption section 11 in FIG. 12) and the interior heat exchanger 4 are connected together through the pair of adsorption side 4-way valves 31, 32 and the pair of adsorption side 3-way valves 35, 36, and out of the evaporation-condensation sections 12, 22, the evaporation-condensation section on the desorption process side (the evaporation-condensation section 22 in FIG. 12) and the interior heat exchanger 4 are connected together through the pair of evaporation and condensation side 4-way valves 33, 34. Accordingly, cool temperature heating medium circulates between the adsorption section on the adsorption process side and the interior heat exchanger 4, and between the evaporation-condensation section on the desorption process side and the interior heat exchanger 4 (see the arrows F11 and the arrows F22 in FIG. 12).

With the exception of the above configurations, the third exemplary embodiment is configured similarly to the first exemplary embodiment described above. In the first heating mode of the third exemplary embodiment, the heating medium circulates between the evaporation-condensation section on the desorption process side out of the evaporation-condensation sections 12, 22, and the interior heat exchanger 4. This thereby enables the heat of condensation of the refrigerant to be utilized to heat the vehicle cabin. In the second heating mode, the heating medium circulates between the adsorption section on the adsorption process side out of the adsorption sections 11, 21, and the interior heat exchanger 4, and between the evaporation-condensation section on the desorption process side out of the evaporation-condensation sections 12, 22, and the interior heat exchanger 4. This thereby enables the heat of adsorption and the heat of condensation of the refrigerant to be utilized to heat the vehicle cabin. This thereby enables the heating efficiency to be improved, similarly to in the first exemplary embodiment described above. Moreover, in the third exemplary embodiment, the condensation side 3-way valves 37, 38, the evaporation side 3-way valves 39, 40, and the pipes 73 to 82 according to the first exemplary embodiment described above are omitted, thereby enabling the flow path system to be achieved with an even simpler configuration.

Note that in the third exemplary embodiment, in the first heating mode (see FIG. 11) configuration is made in which the heating medium circulates between the evaporation-condensation section on the desorption process side out of the evaporation-condensation sections 12, 22 (the evaporation-condensation section 22 in FIG. 11), and the interior heat exchanger 4. However, the present invention is not limited thereto. Namely, as in a modified example of the first heating mode illustrated in FIG. 13, configuration may be made in which the heating medium circulates between the adsorption section on the adsorption process side out of the adsorption sections 11, 21 (the adsorption section 11 in FIG. 13) and the interior heat exchanger 4, and between the evaporation-condensation section on the adsorption process side out of the evaporation-condensation sections 12, 22 (the evaporation-condensation section 12 in FIG. 13) and the interior heat exchanger 4 (see the arrows F12 in FIG. 13). In this modified example of the first heating mode, the directions of the flow paths through the pair of evaporation and condensation side 4-way valves 33, 34 and the flow paths through the pair of adsorption side 3-way valves 35, 36 are the reverse of those in FIG. 11. This modified example of the first heating mode enables heat combining the heat of adsorption and the heat of vaporization of the refrigerant to be utilized as an auxiliary heat source to heat the vehicle cabin in the first heating mode.

Fourth Exemplary Embodiment

As illustrated in FIG. 14 to FIG. 17, in a vehicular adsorption type air conditioning device 140 according to a fourth exemplary embodiment of the present invention, configuration of a flow path system 142 differs from that of the flow path system 30 according to the first exemplary embodiment described above. In the flow path system 142, the condensation side 3-way valves 37, 38 and the pipes 73 to 76 according to the first exemplary embodiment described above are omitted. In the flow path system 142, an end portion of the pipe 71 on the opposite side to the evaporation and condensation side 4-way valve 33 is connected to the pipe 64 through the pipe 79, and an end portion of the pipe 72 on the opposite side to the evaporation and condensation side 4-way valve 34 is connected to the pipe 68 through the pipe 81.

Figure 14:
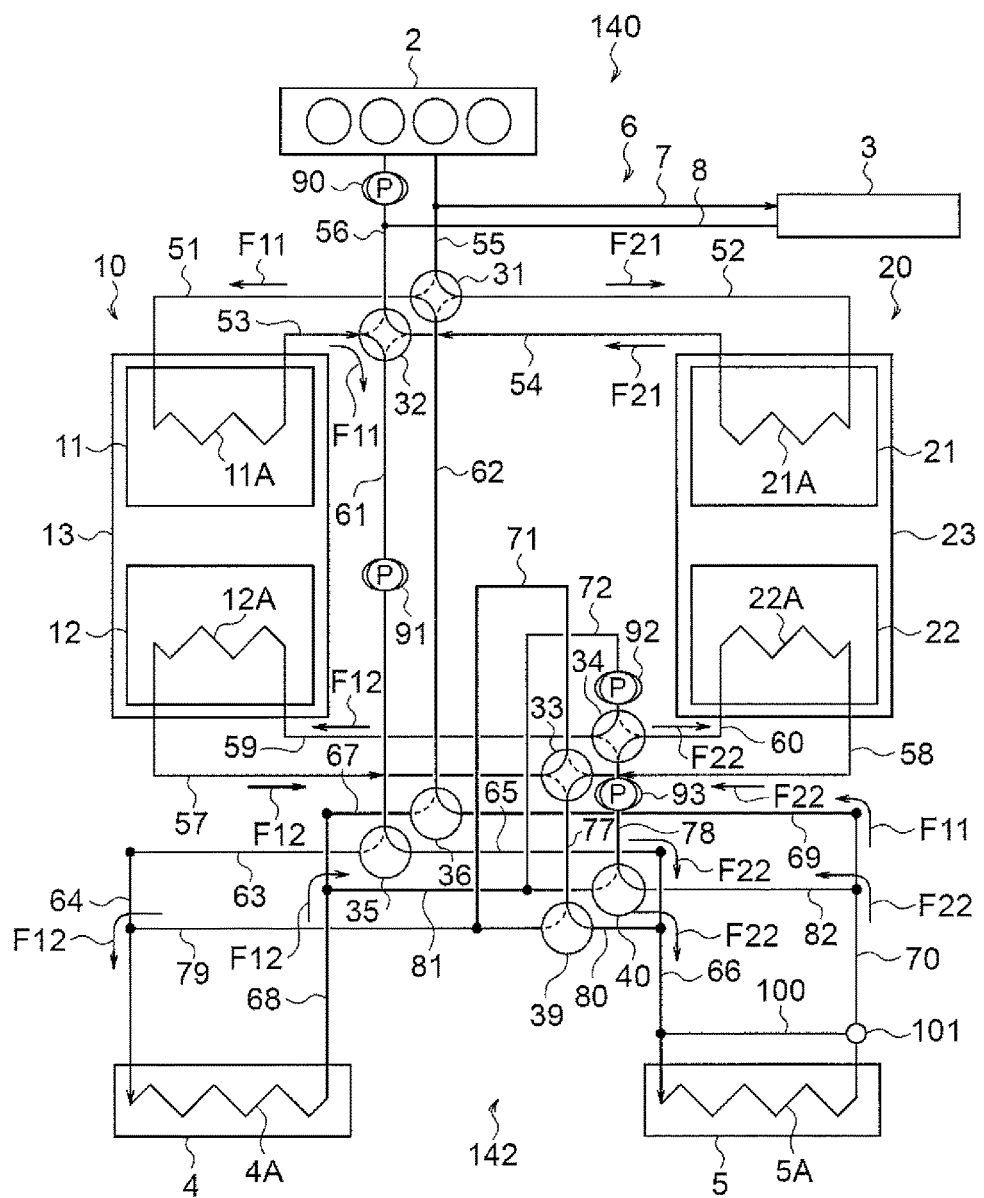
FIG. 14 is a schematic diagram illustrating a cooling mode in a vehicular adsorption type air conditioning device according to a fourth exemplary embodiment of the present invention.
Figure 15:
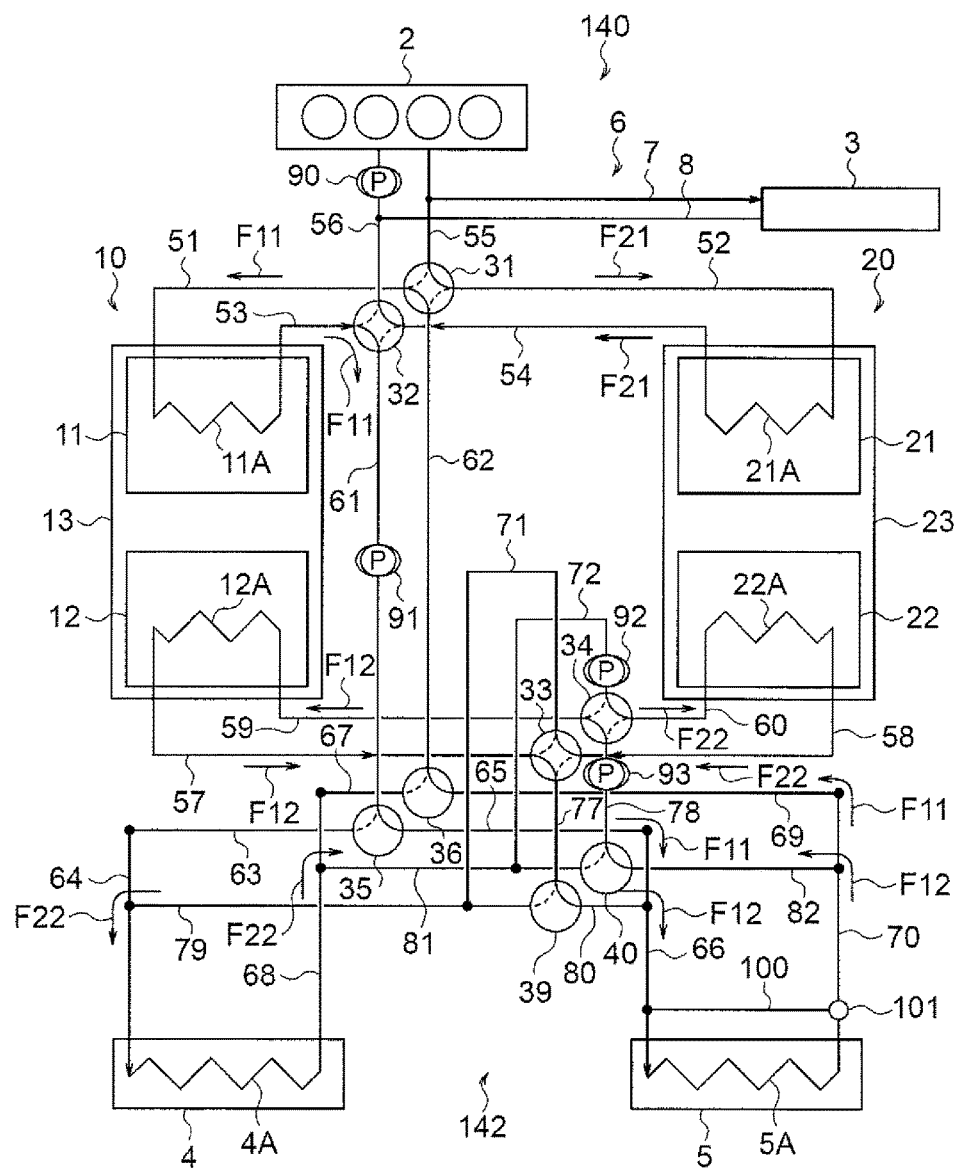
FIG. 15 is a schematic diagram corresponding to FIG. 14, illustrating a first heating mode of a vehicular adsorption type air conditioning device according to the fourth exemplary embodiment.
Figure 16:
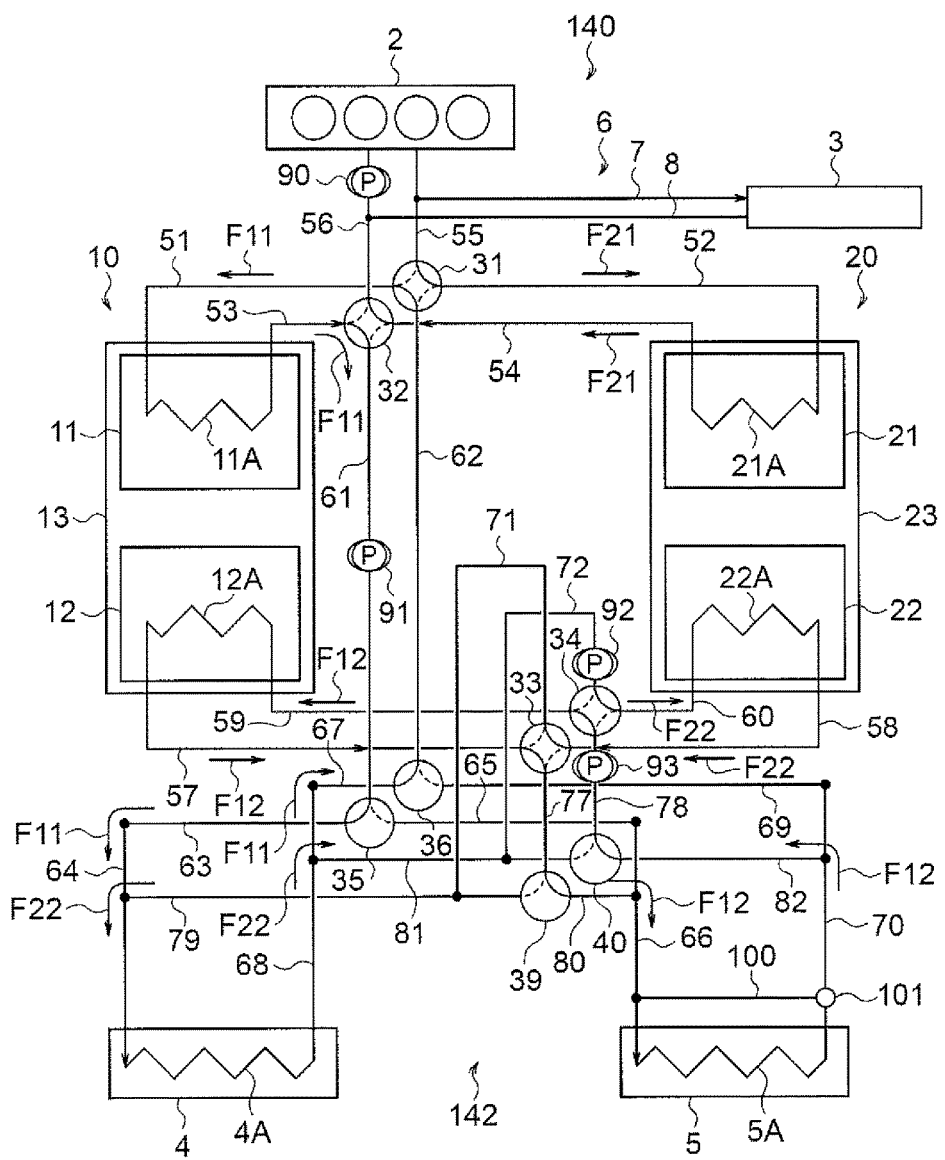
FIG. 16 is a schematic diagram corresponding to FIG. 14, illustrating a second heating mode of a vehicular adsorption type air conditioning device according to the fourth exemplary embodiment.
Figure 17:
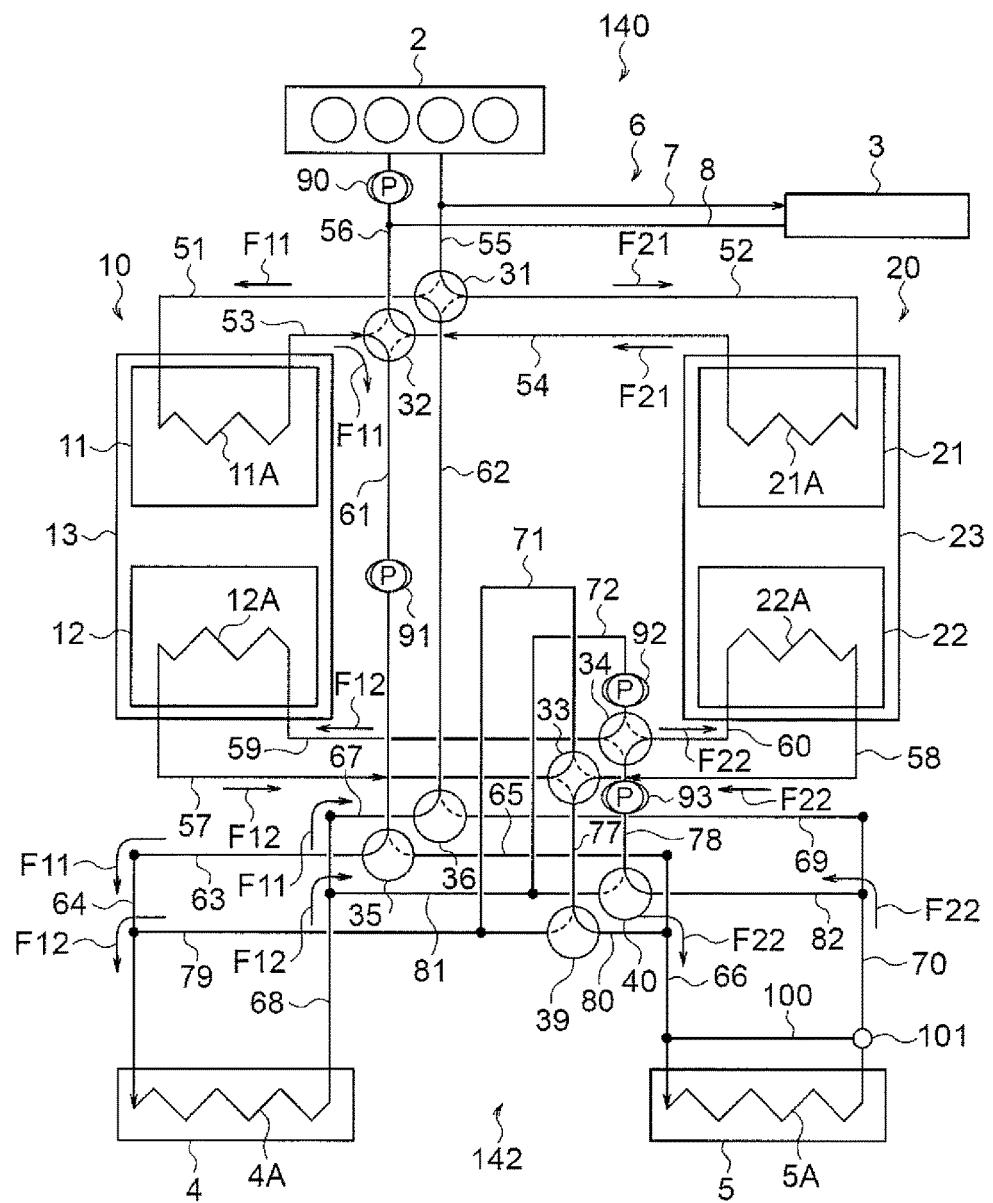
FIG. 17 is a schematic diagram corresponding to FIG. 14, illustrating a modified example of a first heating mode of a vehicular adsorption type air conditioning device according to the fourth exemplary embodiment.

In the fourth exemplary embodiment, the state illustrated in FIG. 14 corresponds to the "cooling mode", the state illustrated in FIG. 15 corresponds to the "first heating mode", and the state illustrated in FIG. 16 corresponds to the "second heating mode". Specific explanation follows thereof.

In the cooling mode illustrated in FIG. 14, out of the adsorption sections 11, 21, the adsorption section on the desorption process side (the adsorption section 21 in FIG. 14) and the engine 2 are connected together through the pair of adsorption side 4-way valves 31, 32. Accordingly, the high temperature heating medium circulates between the adsorption section on the desorption process side and the engine 2 (see the arrows F21 in FIG. 14). This point is also common to the first heating mode and the second heating mode.

In the cooling mode, out of the adsorption sections 11, 21, the adsorption section on the adsorption process side (the adsorption section 11 in FIG. 14) and the radiator 5 are connected together through the pair of adsorption side 4-way valves 31, 32 and the pair of adsorption side 3-way valves 35, 36, and out of the evaporation-condensation sections 12, 22, the evaporation-condensation section on the desorption process side (the evaporation-condensation section 22 in FIG. 14) and the radiator 5 are connected together through the pair of evaporation and condensation side 4-way valves 33, 34 and the pair of evaporation side 3-way valves 39, 40. Accordingly, cool temperature heating medium circulates between the adsorption section on the adsorption process side and the radiator 5, and between the evaporation-condensation section on the desorption process side and the radiator 5 (see the arrows F11 and the arrows F22 in FIG. 14).

Moreover, in the cooling mode, out of the evaporation-condensation sections 12, 22, the evaporation-condensation section on the adsorption process side (the evaporation-condensation section 12 in FIG. 14) and the interior heat exchanger 4 are connected together through the pair of evaporation and condensation side 4-way valves 33, 34. Accordingly, cold temperature heating medium circulates between the evaporation-condensation section on the adsorption process side and the interior heat exchanger 4 (see the arrows F12 in FIG. 14).

In the first heating mode illustrated in FIG. 15, out of the adsorption sections 11, 21, the adsorption section on the adsorption process side (the adsorption section 11 in FIG. 15) and the radiator 5 are connected together through the pair of adsorption side 4-way valves 31, 32 and the pair of adsorption side 3-way valves 35, 36, and out of the evaporation-condensation sections 12, 22, the evaporation-condensation section on the adsorption process side (the evaporation-condensation section 12 in FIG. 15) and the radiator 5 are connected together through the pair of evaporation and condensation side 4-way valves 33, 34 and the pair of evaporation side 3-way valves 39, 40. Accordingly, cold temperature and cool temperature heating medium circulates between the adsorption section on the adsorption process side and the radiator 5, and between the evaporation-condensation section on the adsorption process side and the radiator 5, respectively (see the arrows F11 and the arrows F12 in FIG. 15).

In the first heating mode, out of the evaporation-condensation sections 12, 22, the evaporation-condensation section on the desorption process side (the evaporation-condensation section 22 in FIG. 15) and the interior heat exchanger 4 are connected together through the pair of evaporation and condensation side 4-way valves 33, 34. Accordingly, cool temperature heating medium circulates between the evaporation-condensation section on the desorption process side and the interior heat exchanger 4 (see the arrows F22 in FIG. 15).

In the second heating mode illustrated in FIG. 16, out of the evaporation-condensation sections 12, 22, the evaporation-condensation section on the adsorption process side (the evaporation-condensation section 12 in FIG. 16) and the radiator 5 are connected together through the pair of evaporation and condensation side 4-way valves 33, 34 and the pair of evaporation side 3-way valves 39, 40. Accordingly, cold temperature heating medium circulates between the evaporation-condensation section on the adsorption process side and the radiator 5 (see the arrows F12 in FIG. 16).

In the second heating mode, out of the adsorption sections 11, 21, the adsorption section on the adsorption process side (the adsorption section 11 in FIG. 16) and the interior heat exchanger 4 are connected together through the pair of adsorption side 4-way valves 31, and the pair of adsorption side 3-way valves 35, 36, and out of the evaporation-condensation sections 12, 22, the evaporation-condensation section on the desorption process side (the evaporation-condensation section 22 in FIG. 16) and the interior heat exchanger 4 are connected together through the pair of evaporation and condensation side 4-way valves 33, 34.

Accordingly, cool temperature heating medium circulates between the adsorption section on the adsorption process side and the interior heat exchanger 4, and between the evaporation-condensation section on the desorption process side and the interior heat exchanger 4 (see the arrows F11 and the arrows F22 in FIG. 16).

With the exception of the above configurations, the fourth exemplary embodiment is configured similarly to the first exemplary embodiment described above. In the first heating mode of the fourth exemplary embodiment, the heating medium circulates between the evaporation-condensation section on the desorption process side out of the evaporation-condensation sections 12, 22, and the interior heat exchanger 4. This thereby enables the heat of condensation of the refrigerant to be utilized to heat the vehicle cabin. In the second heating mode, the heating medium circulates between the adsorption section on the adsorption process side out of the adsorption sections 11, 21, and the interior heat exchanger 4, and between the evaporation-condensation section on the desorption process side out of the evaporation-condensation sections 12, 22, and the interior heat exchanger 4. This thereby enables the heat of adsorption and the heat of condensation of the refrigerant to be utilized to heat the vehicle cabin. Accordingly, the heating efficiency can be improved, similarly to in the first exemplary embodiment described above. Moreover, in the fourth exemplary embodiment, the condensation side 3-way valves 37, 38 and the pipes 73 to 76 according to the first exemplary embodiment described above are omitted, thereby enabling the flow path system to be achieved with an even simpler configuration.

Note that in the fourth exemplary embodiment, in the first heating mode (see FIG. 15) configuration is made in which the heating medium circulates between the evaporation-condensation section on the desorption process side out of the evaporation-condensation sections 12, 22 (the evaporation-condensation section 22 in FIG. 15), and the interior heat exchanger 4. However, the present invention is not limited thereto. Namely, as in a modified example of the first heating mode illustrated in FIG. 17, configuration may be made in which the heating medium circulates between the adsorption section on the adsorption process side out of the adsorption sections 11, 21 (the adsorption section 11 in FIG. 17) and the interior heat exchanger 4, and between the evaporation-condensation section on the adsorption process side out of the evaporation-condensation sections 12, 22 (the evaporation-condensation section 12 in FIG. 17) and the interior heat exchanger 4 (see the arrows F12 in FIG. 17). In this modified example of the first heating mode, the directions of the flow path through the pair of evaporation and condensation side 4-way valves 33, 34 and the flow path through the pair of adsorption side 3-way valves 35, 36 are the reverse of those in FIG. 15. This modified example of the first heating mode enables heat combining the heat of adsorption and the heat of vaporization of the refrigerant to be utilized as an auxiliary heat source to heat the vehicle cabin in the first heating mode.

Supplementary Explanation of the Exemplary Embodiments

In the respective exemplary embodiments described above, the vehicular adsorption type air conditioning device 1 is configured including the pair of adsorption vessels 10, 20. However, there is no limitation thereto, and it is sufficient that the vehicular adsorption type air conditioning device according to the present invention includes plural adsorption vessels. For example, the vehicular adsorption type air conditioning device according to the present invention may be configured including two pairs (two sets) of the adsorption vessels 10, 20, and including two flow path systems similar to any one of the flow path systems 30, 122, 132, 142. In such cases, for example, one flow path system connected to one pair of the adsorption vessels 10, 20, and another flow path system connected to another pair of the adsorption vessels 10, 20 may be mutually connected on the engine 2 side, the interior heat exchanger 4 side, and the radiator 5 side.

When configuration is made with two sets of the adsorption vessels 10, 20 as described above, switching timings to alternate between the adsorption process and the desorption process in one pair of the adsorption vessels 10, 20 is preferably staggered with respect to switching timings to alternate between the adsorption process and the desorption process in the other pair of the adsorption vessels 10, 20. Namely, staggering the timings at which the one pair of the adsorption vessels 10, 20 reaches a saturated state for the adsorption ability of the adsorbent, and a timing at which the other pair of the adsorption vessels 10, 20 reaches a saturated state for the adsorption ability of the adsorbent enables the cold temperature for cooling utilizing the latent heat of evaporation to be obtained even more continuously.

In the respective exemplary embodiments described above, explanation has been given regarding examples in which the flow path systems 30, 122, 132, 142 include 3-way valves (flow path switching valves). However, the present invention is not limited thereto, and configuration may be made with another type of flow path switching valves set in place of 3-way valves, and the configuration of the flow path system may be modified as appropriate.

In the respective exemplary embodiments described above, the flow path systems 30, 122, 132, 142 are configured including the bypass pipe 100 and the flow rate control valve 101. However, the present invention is not limited thereto, and configuration may be made in which the bypass pipe 100 and the flow rate control valve 101 are omitted.

In the respective exemplary embodiments described above, explanation has been given regarding a case in which the engine 2 of the vehicle is employed as the high temperature heat source. However, the present invention is not limited thereto. For example, in cases in which the vehicle is an electric vehicle or a fuel cell vehicle, configuration may be made in which a battery is employed as the high temperature heat source.

Various other modifications may be implemented within a range not departing from the spirit of the present invention. Obviously, the scope of rights of the present invention is not limited to the respective exemplary embodiments described above.

What is claimed is:

1. A vehicular adsorption type air conditioning device comprising: a heater core and an interior heat exchanger that perform heat exchange between air inside a vehicle cabin and a heating medium; an exterior heat exchanger that performs heat exchange between air outside the vehicle cabin and the heating medium; a heating flow path section that circulates the heating medium between a heat source of the vehicle and the heater core; a plurality of adsorption vessels each including an adsorption section and an evaporation-condensation section, with an adsorbent and a refrigerant sealed within the adsorption vessels; and a flow path system that interchanges the heating medium between: the plurality of adsorption vessels and each of the heat source, the exterior heat exchanger, and the interior heat exchange, and that, while causing an adsorption process to take place in at least one of the plurality of the adsorption vessels, causes a desorption process to take place in at least one other adsorption vessel; the flow path system being capable of switching between a cooling mode in which the heating medium is circulated between the evaporation-condensation section of the at least one of the plurality of the adsorption vessels on an adsorption process side and the interior heat exchanger, a first heating mode in which the heating medium is circulated between the interior heat exchanger and the adsorption section of the at least one of the plurality of the adsorption vessels on the adsorption process side or the evaporation-condensation section of the at least one other adsorption vessel on a desorption process side, or the heating medium is circulated between the interior heat exchanger and both the adsorption section of the at least one of the plurality of the adsorption vessels on the adsorption process side and the evaporation-condensation section of the at least one of the plurality of the adsorption vessels on the adsorption process side, and a second heating mode in which the heating medium is circulated in parallel: (i) between the interior heat exchanger and the adsorption section of the at least one of the plurality of the adsorption vessels on the adsorption process side, and (ii) between the interior heat exchanger and the evaporation-condensation section of the at least one other adsorption vessel on the desorption process side.

* * * * *